United States Patent
Yamamoto et al.

[11] Patent Number: 6,166,372
[45] Date of Patent: Dec. 26, 2000

[54] POLARIZATION DETECTION DEVICE AND METHOD FOR PRODUCING THE SAME

[75] Inventors: Hiroyuki Yamamoto, Kashihara; Yoshio Yoshida, Nara, both of Japan

[73] Assignee: Sharp Kabushiki Kaisha, Osaka, Japan

[21] Appl. No.: 09/085,682

[22] Filed: May 27, 1998

[30] Foreign Application Priority Data

May 27, 1997 [JP] Japan ..................................... 9-137293
Nov. 27, 1997 [JP] Japan ..................................... 9-326024

[51] Int. Cl.$^7$ ....................................................... G02B 6/34
[52] U.S. Cl. ................ 250/225; 250/227.14; 250/227.17
[58] Field of Search ............................. 250/225, 227.14, 250/227.11, 227.17; 257/431, 432; 385/14; 369/110

[56] References Cited

U.S. PATENT DOCUMENTS 5,220,573  6/1993  Sakata et al. .............................. 372/50
5,946,433  8/1999  Yamamoto et al. ....................... 385/36

OTHER PUBLICATIONS

T. Isobe et al., Japanese Laid–Open Publication No. 5–101476, laid open on Apr. 23, 1993 with partial English translation.
H. Yamamoto et al., Japanese Laid–Open Publication No. 6–82644, laid open on Mar. 25, 1994 with English abstract.
M. Aoki et al., Japanese Laid–Open Publication No. 4–142503, laid open on May 15, 1992 with partial English translation.

*Primary Examiner*—John R. Lee
*Attorney, Agent, or Firm*—David G. Conlin; Christine C. O'Day; Edwards & Angell, LLP

[57] ABSTRACT

A polarization detection device includes a photocoupler; an optical waveguide layer for propagating light from the photocoupler therethrough; a polarization splitter for splitting the propagation light into two components having different refractive angles; and a photodetector formed of a semiconductor material for performing photoelectric conversion on the propagation light split into the two components. The photocoupler, the optical waveguide layer, the polarization splitter, and the photodetector are provided on a single semiconductor substrate. The photocoupler is one of a prism and a beam splitter formed of a dielectric material and supported by the optical waveguide layer only by an adhesive layer, the adhesive layer having a straight edge in the vicinity of the photocoupler. The adhesive layer has a thickness d fulfilling expression (1) where a longer diameter of a beam spot of the light incident on the photocoupler on an interface between the adhesive layer and the optical waveguide layer is L, and the angle of incidence of the light with respect to the optical waveguide layer is θ:

$$d \geq L/\tan\theta \qquad (1).$$

24 Claims, 27 Drawing Sheets

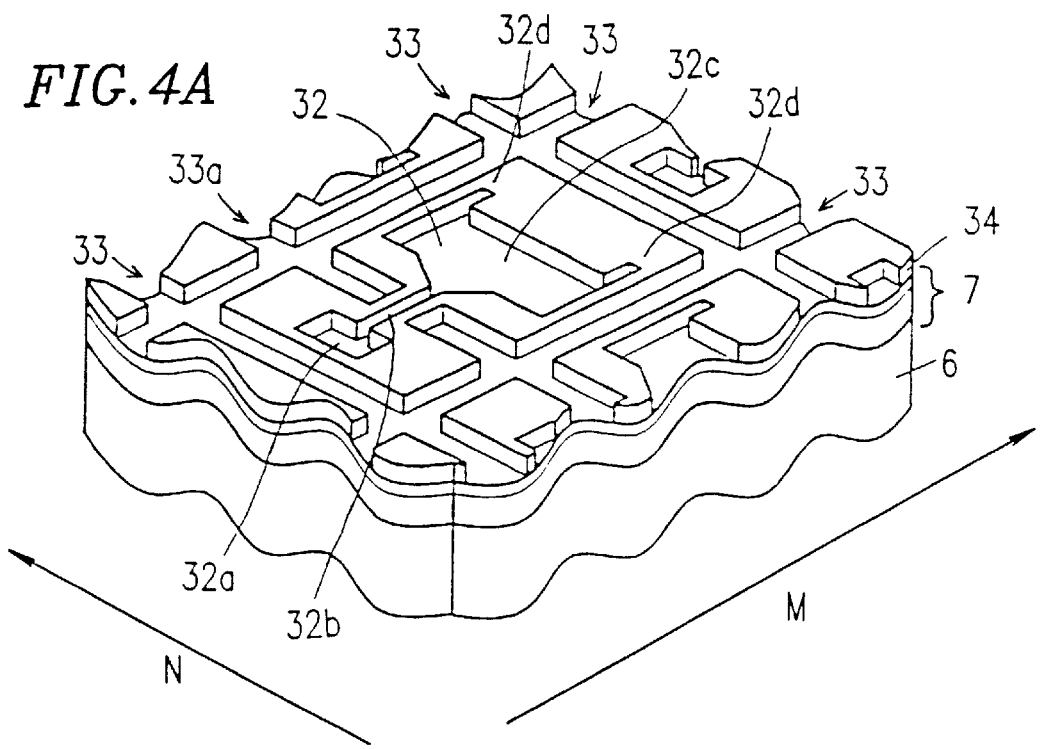
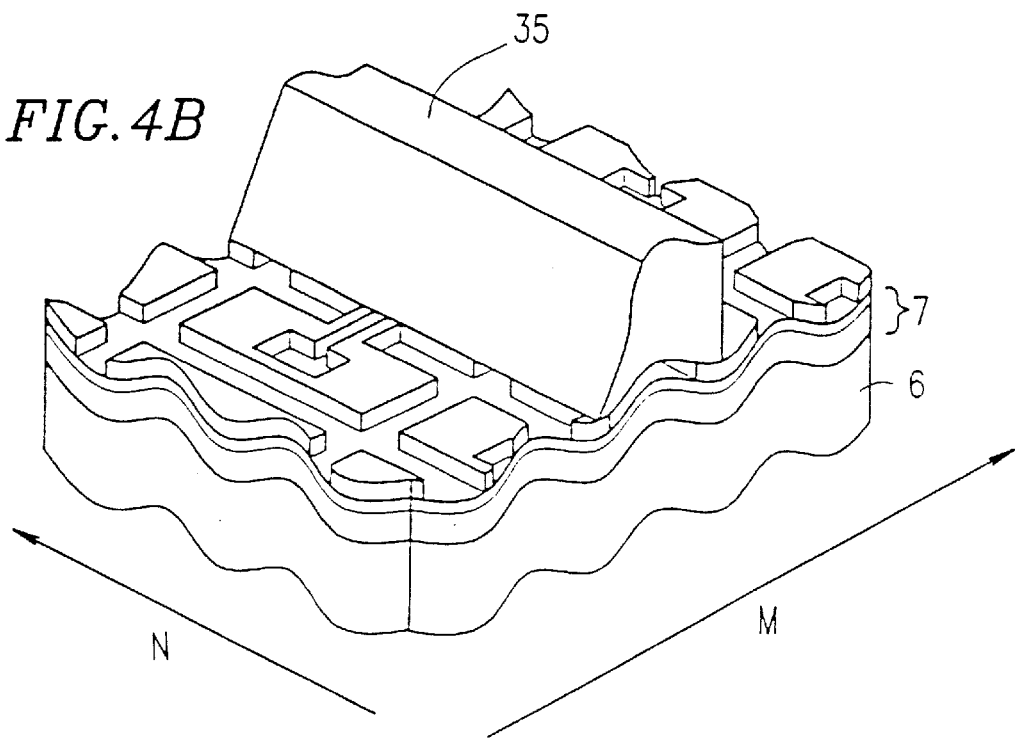

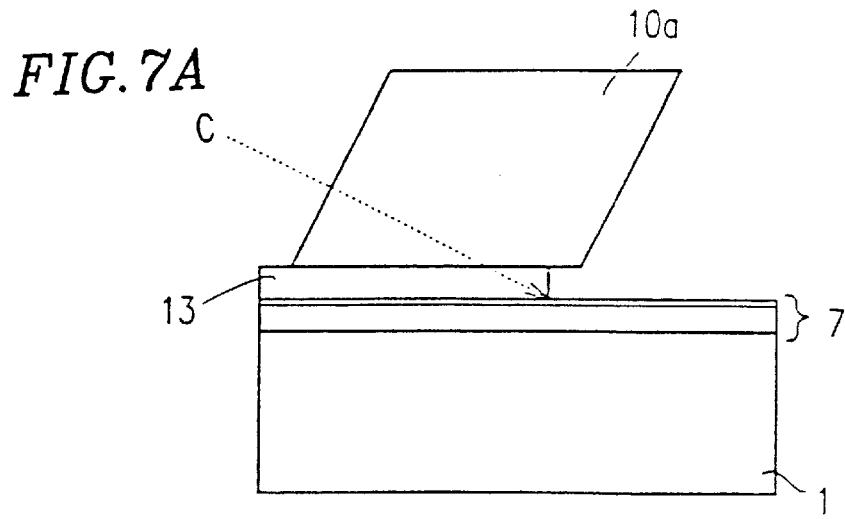
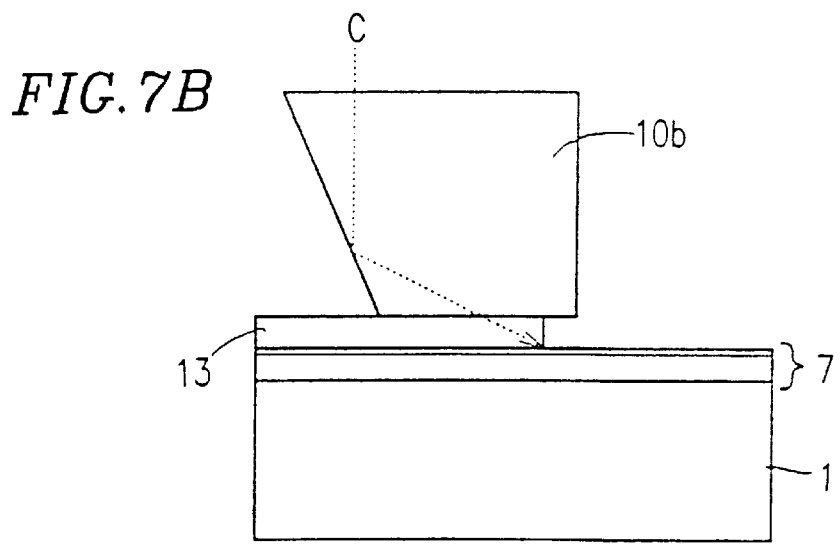
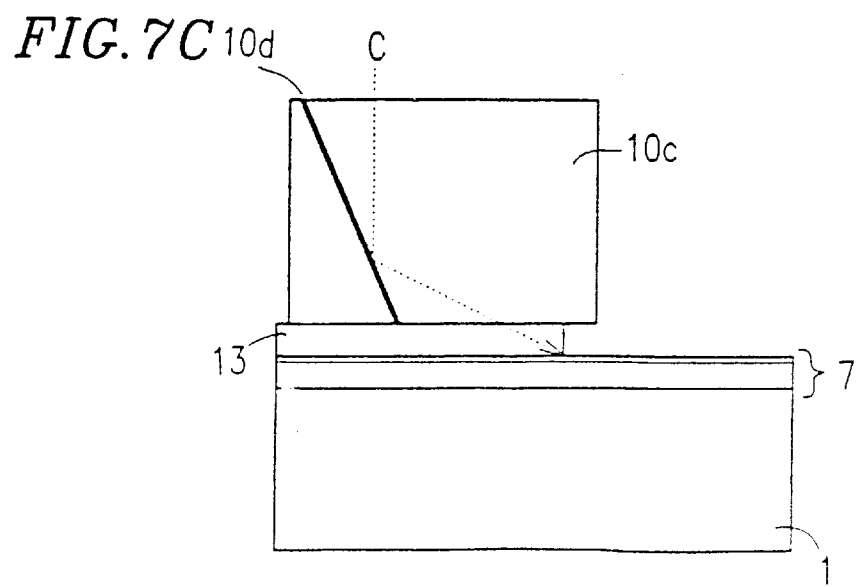

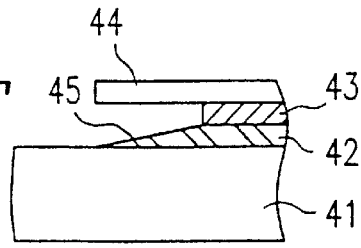
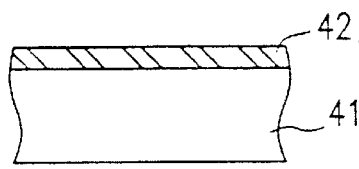
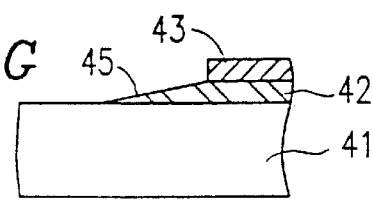
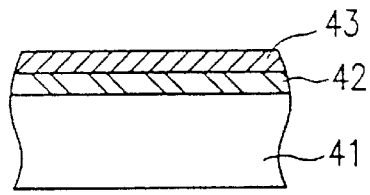
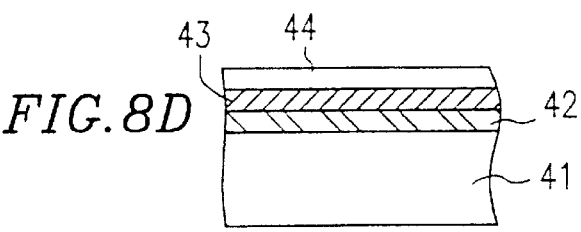
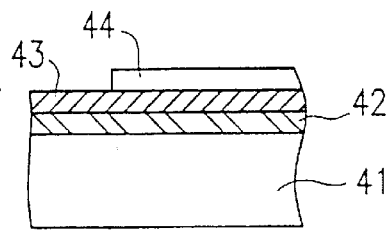

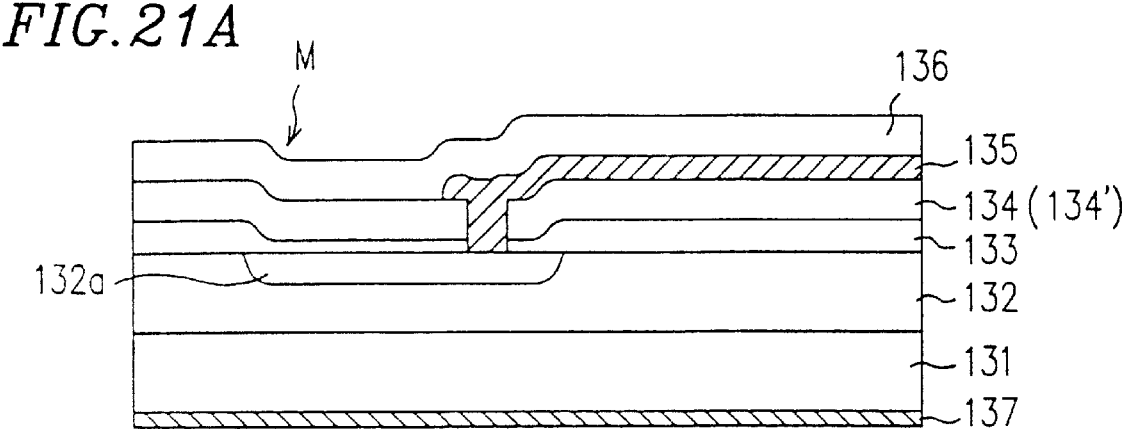
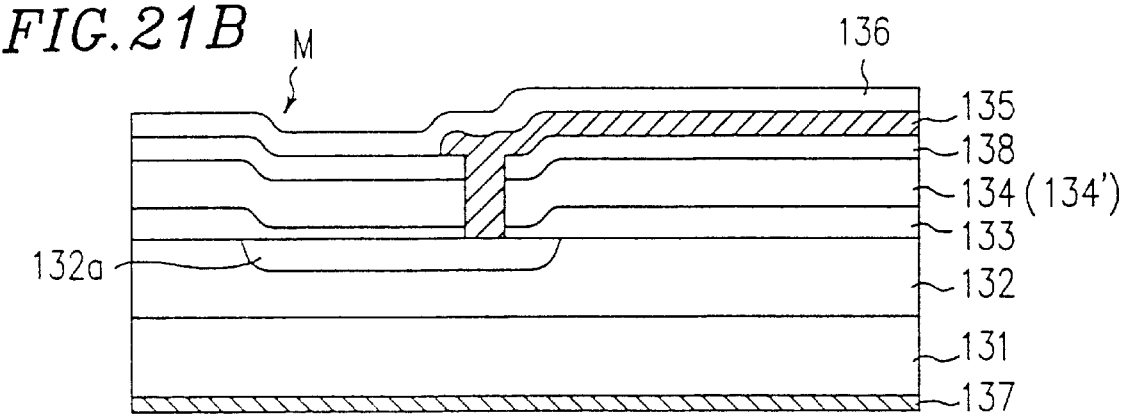

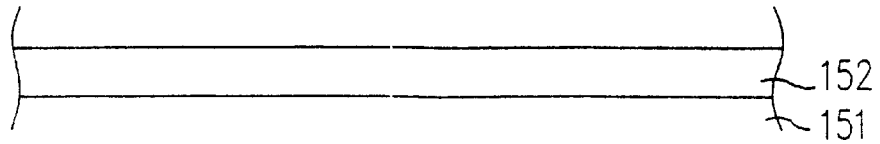
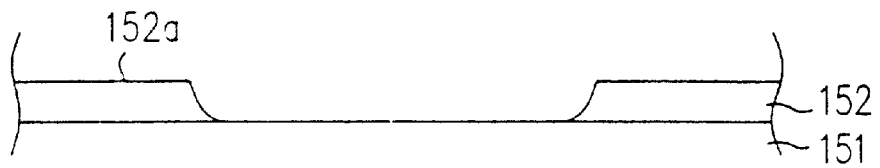
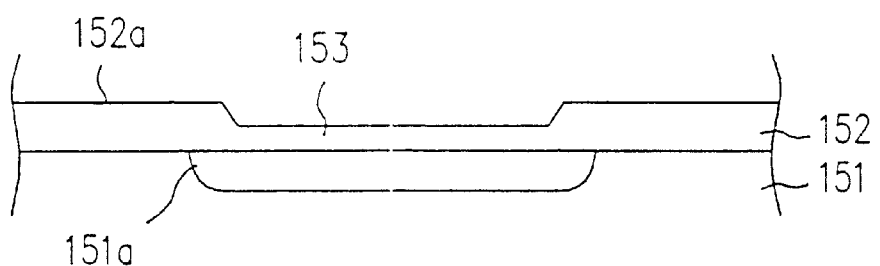
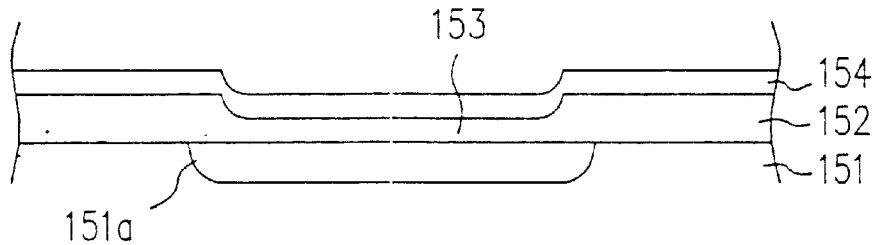
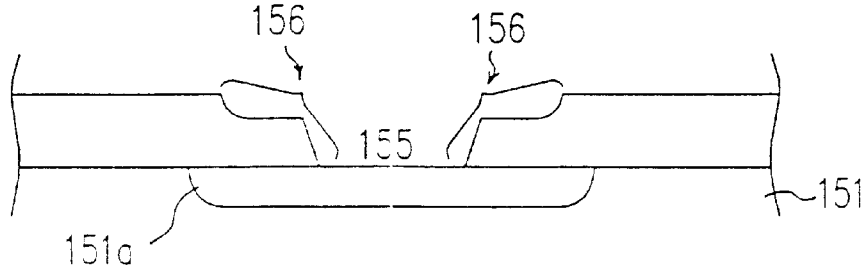

POLARIZATION DETECTION DEVICE AND METHOD FOR PRODUCING THE SAME

BACKGROUND OF THE INVENTION

1. Field of the Invention

The present invention relates to a polarization detection device in an integrated optical waveguide device usable in, for example, a magneto-optic information recording and reproduction device, and a method for producing the same.

2. Description of the Related Art

Magneto-optic disks have conventionally been a target of active research and development as a rewritable high-density recording medium. Information is reproduced by detecting the rotation of the polarization direction of light reflected by the magneto-optic recording medium, the polarization of the light being caused by a Kerr effect.

Since the rotation in the polarization direction caused by the Kerr effect is microscopic, realization of a satisfactory signal-to-noise (S/N) ratio requires, for example, a high-precision photodetector or differential detection. As such, bulk-type optical systems including a photodetector, a prism, a mirror and a lens are conventionally used. The bulk-type optical systems have a problem in that positional alignment among the optical elements is difficult. The bulk-type optical systems have another problem in that it is difficult to reduce the size and weight of an apparatus including the system.

Recently, to solve the drawbacks of the bulk-type optical systems, waveguide-type photodetector semiconductor devices have been developed, in which a detecting optical system is integrated on a thin film waveguide. FIG. 17 shows a schematic structure of such a waveguide-type photodetector, i.e., a conventional waveguide-type magneto-optic information recording and reproduction device including a detecting integrated element 95.

The magneto-optic information recording and reproduction device includes a light source 91 including a semiconductor laser or the like; a light converging optical system located so as to converge light from the light source 91 on a magneto-optic information recording medium 92, the light converging optical system including a collimator lens 93 and an object lens 94; a detecting integrated element 95 for detecting light reflected by the magneto-optic information recording medium 92; and a prism coupler 96 provided on the detecting integrated element 95 between the collimator lens 93 and the object lens 94 for causing the light incident on the prism coupler 96 from the collimator lens 93 to be reflected on a bottom surface of the prism coupler 96 so as to propagate toward the object lens 94 and for guiding the reflected light from the magneto-optic information recording medium 92 toward the detecting integrated element 95 as waveguide mode light.

Next, with reference to FIG. 18, the detecting integrated element 95 will be described in detail. The detecting integrated element 95 includes a blank area A and a dotted area B. The area A is a first waveguide area. The prism coupler 96 for guiding the reflected light from the magneto-optic information recording medium 92 is provided on a top surface of the first waveguide area A. The area B is a second waveguide area. The second waveguide area B is provided so as to cause photocoupling together with the first waveguide area A.

Photodetectors 101 and 102 are provided on one end of the area B, and waveguide light converging elements 103 and 104 are provided on another end of the area B opposite to the one end. The waveguide light converging elements 103 and 104 guide the reflected light from the magneto-optic information recording medium 92 to the photodetectors 101 and 102. The photodetectors 101 and 102 are included in a focusing error signal (Fo signal) detection section 105.

The area B further includes a third waveguide area 108. The third waveguide area 108 is a mode splitter for reflecting TE mode light of the reflected light from the magneto-optic information recording medium 92 and refracting TM mode light of the reflected light. The area B also includes photodetectors 106 and 107, respectively, for detecting the TE mode light and the TM mode light. The photodetectors 106 and 107 are included in a magneto-optic signal (MO signal) detection section 109.

The first effective indices of the TEo mode light and TMo mode light in the first waveguide area A are Ne1 and Nm1, respectively, and second effective indices of the TEo mode light and TMo mode light in the second waveguide area B are Ne2 and Nm2, respectively. The first effective indices Ne1 and Nm1 are substantially equal to each other, and the second effective indices Ne2 and Nm2 are different from each other.

Next, the operation of the waveguide-type photodetector shown in FIG. 17 will be described.

Light emitted by the light source 91 is collimated by the collimator lens 93 and is incident on the prism coupler 96. The incident light is reflected by the bottom surface of the prism coupler 96 and is converged on the magneto-optic information recording medium 92 after passing through the object lens 94. The returning light which is reflected by the magneto-optic information recording medium 92 is again incident on the prism coupler 96 after passing through the object lens 94. The reflected light from the magneto-optic information recording medium 92 is coupled to the first waveguide area A via the prism coupler 96 to become waveguide light.

The light guided in the first waveguide area A is optically coupled to the second waveguide area B and then guided to the photodetectors 101 and 102 via the waveguide light converging elements 103 and 104. The light guided in the first waveguide area A and optically coupled to the second waveguide area B is also guided to the photodetectors 106 and 107 via the third waveguide area 108. In other words, the waveguide light is guided to the focusing error signal detection section 105 and the magneto-optic signal detection section 109. Therefore, a focusing error signal is detected by the focusing error signal detection section 105, and a magneto-optic signal is detected by the magneto-optic signal detection section 109.

With reference to FIG. 19, a photocoupler for performing photocoupling will be described. On a waveguide layer 112, a first gap layer 113 having a refractive index lower than that of the waveguide layer 112 is provided. On the first gap layer 113, a second gap layer 115 having a missing end portion is provided. The prism coupler 96 is provided on a portion of the second gap layer 115 and over the first gap layer 113 with an adhesive layer 116 interposed therebetween. The refractive index of the prism coupler 96 is substantially equal to the refractive index of the adhesive layer 116 and is higher than the refractive index of the waveguide layer 113. The second gap layer 115 has a suitable thickness so that the light is coupled to the first gap layer 113 through the missing end portion and also the light, which is once coupled to the first waveguide layer 113, is prevented from coupling to the prism coupler 96 to come out of the prism coupler 96.

In general, a plurality of devices are formed simultaneously on one substrate. In order to divide such a plurality of devices into chips, cleavage of the crystalline substrate can be sometimes utilized. In most cases, the substrate is diced with a diamond blade. However, a large amount of dust is generated in the case of dicing and adhesion of the dust to the surface of the substrate causes a problem of deterioration of performance of the waveguide element.

As a solution to this problem, Japanese Laid-Open Publication No. 4-142503 describes that adhesion of the dust to the substrate is prevented by forming a protection film on a surface of a substrate and removing the protection film after dicing.

With reference to FIG. 20, a mode splitter for splitting the propagation light into TEo mode light and TMo mode light will be described. In order to prevent loss, the thickness of an end portion of a second waveguide layer 122 in the second waveguide area is gradually reduced, and the end portion acts as a first coupling section. The angle of the incident light guided to the end portion with respect to the TEo mode light is larger than a threshold angle. Accordingly, the TEo mode light is reflected and the TMo mode light is refracted.

Hereinafter, with reference to FIGS. 21A and 21B, structures and general production methods of the waveguide-type photodetectors 101, 102, 106 and 107 of FIGS. 18 will be described. FIGS. 21A and 21B are cross-sectional views of each of the waveguide-type photodetectors 101, 102, 106 and 107. FIGS. 21A and 21B show different structures usable for the waveguide-type photodetectors 101, 102, 106 and 107.

First, a structure of the waveguide-type photodetectors 101, 102, 106 and 107 will be described. As shown in FIG. 21A, an $N^-$ epitaxial layer 132 having a $P^+$ region 132a formed by diffusing boron or the like is provided on an $N^+$ Si substrate 131. The $P^+$ region 132a acts as a light receiving section of a light receiving element. On the $N^-$ epitaxial layer 132, a thermal $SiO_2$ film 133 formed by thermal oxidation is provided. The thickness of the thermal $SiO_2$ film 133 is reduced on the $P^+$ region 132a. On the thermal $SiO_2$ film 133, a waveguide layer 134 formed of a first waveguide layer or a second waveguide layer (or a waveguide layer 134' in which a first waveguide layer and a second waveguide layer are integrated) is provided.

An interconnection 135 is provided so as to be connected to the $P^+$ region 132a via an opening formed through the thermal $SiO_2$ film 133 and the waveguide layer 134 (or 134'). A gap layer 136 is provided so as to cover the waveguide layer 134 (or 134') and the interconnection 135. A rear electrode 137 is provided on a rear surface of the $N^+$ Si substrate 131.

Each of the waveguide-type photodetectors 101, 102, 106 and 107 having the above-described structure is formed in the following manner.

First, the $N^-$ epitaxial layer 132 is grown on the $N^+$ Si substrate 131, and then the thermal $SiO_2$ film 133 is formed thereon. A part of the thermal $SiO_2$ film 133 included in a portion which will act as a photodetecting section is removed by etching or the like, and the resultant laminate is left in a high temperature atmosphere containing boron or the like. Thus, boron is diffused in the $N^-$ epitaxial layer 132 from the removed portion, thereby forming the $P^+$ region 132a. Next, the waveguide layer 134 (or the waveguide layer 134') is formed on the thermal $SiO_2$ film 133. The opening is formed through the waveguide layer 134 (or 134') and the thermal $SiO_2$ film 133 in positional correspondence with the $P^+$ region 132a.

Then, an electrode material is formed on the waveguide layer 134 (or 134') and patterned, thereby forming the interconnection 135. The gap layer 136 is then formed so as to cover the waveguide layer 134 (or 134') and the interconnection 135. On the rear surface of the $N^+$ Si substrate 131, the rear electrode 137 is formed. In this manner, each of the waveguide-type photodetectors 101, 102, 106 and 107 is produced.

In order to improve the photodetection efficiency of each of the waveguide-type photodetectors 101, 102, 106 and 107, the gap layer or buffer layer 136 has a tapered structure, in which the thickness of the gap layer 136 is gradually reduced starting from a front side of the waveguide-type photodetector on which the waveguide light is to be incident. Due to such a structure, the waveguide light is received by the waveguide-type photodetector using a waveguide tapering part M. The received light is sent to an external control circuit (not shown) through the interconnection 135, thereby performing photodetection.

In the case where a light receiving element such as a photodiode provided on the $N^+$ Si substrate 131 is used as the light receiving section of the waveguide-type photodetector, the interconnection is provided in order to send an electric signal such as an electric current corresponding to the amount of the light received by the light receiving element to an external device. The interconnection is usually formed of a metal material on an insulative film on the $N^+$ Si substrate 131.

Hereinafter, the interconnection 135 and a structure in the vicinity of the interconnection 135 will be described.

In the waveguide-type photodetectors 101, 102, 106 and 107 having the structure shown in FIG. 21A, the interconnection 135 is formed between the waveguide layer 134 (or 134') on the thermal $SiO_2$ film 133 and the gap layer 136 and is connected to the $P^+$ region 132a acting as the light receiving section of the light receiving element through the opening formed through the waveguide layer 134 (or 134') and the thermal $SiO_2$ film 133.

In this case, the gap layer 136 acts as an upper cladding layer for the waveguide layer 134 (134') and also acts as a layer for effectively protecting the interconnection 135 against shortcircuiting, mechanical damages, physical contamination, corrosion and the like. The interconnection 135, which is isolated from the N+Si substrate 131 by the thermal $SiO_2$ film 133 as well as by the waveguide layer 134 (134'), can maintain the electrostatic capacitance between the interconnection 135 and the $N^+$ Si substrate 131 at a lower level compared to an electric wire isolated from an $N^+$ Si substrate only by a thermal $SiO_2$ film.

In FIG. 21B, each of the waveguide-type photodetectors 101, 102, 106 and 107 includes another gap layer 138 provided between the interconnection 135 and the waveguide layer 134 (134'). The interconnection 135 is provided between the gap layers 138 and 136 and is connected to the $P^+$ region 132a acting as the light receiving section of the light receiving element through an opening formed through the gap layer 138, the waveguide layer 134 (134') and the thermal $SiO_2$ film 133. In such a structure, the gap layer 138 further reduces the electrostatic capacitance between the interconnection 135 and the $N^+$ Si substrate 131.

Recently, waveguide-type photodetectors have been demanded to have a higher-speed response and higher integration for a different use from the use in the integrated element; i.e., for use in a bulk-type optical system. Since the waveguide-type photodetectors are produced in parallel with integrated circuits used in an external control circuit, the structures of the waveguide-type photodetectors have become more complicated. FIG. 22A shows an example of such a waveguide-type photodetector.

The waveguide-type photodetector shown in FIG. 22A includes a thermal SiO$_2$ film 142 acting as a mask for impurity diffusion and metal layers 143 acting as stoppers for etching and also acting as wires in an integrated circuit section in the vicinity of a light receiving section 141. The waveguide-type photodetector further includes, in the vicinity of the light receiving section 141, an anti-reflection silicon nitride film 144, an interlevel insulative nitride film 145, and protection films 146 for protecting the integrated circuit and the metal layers 143. These elements form a step portion having a total height of several micrometers with respect to the light receiving section 141. In FIG. 22A, a lead portion of the interconnections is omitted.

The protection films 146 and the metal layers 143 can be removed, but the anti-reflection silicon nitride film 144 is indispensable due to the function thereof. The thermal SiO$_2$ film 142 is also indispensable in order to protect the PN junction. Even in a most simple structure shown in FIG. 22B, a step portion having a height of about 1 μm is unavoidably formed by the thermal SiO$_2$ film 142.

A step portion of such a height is not a problem for general use, since the light for signal detection is incident from free space.

With reference to FIGS. 23A through 23E, the reason why such a step portion is generated during the production of a waveguide-type photodetector will be described.

As shown in FIG. 23A, a thermal SiO$_2$ film 152 is formed on a silicon substrate 151. Known as methods for forming the thermal SiO$_2$ film 152 are dry oxidation by which the silicon substrate 151 is heated in an oxygen flow, and vapor oxidation by which the silicon substrate 151 is heated in an oxygen flow containing vapor. The thermal SiO$_2$ film 152 formed in such a manner is patterned by a photoresist or the like and etched to form a thermal SiO$_2$ mask 152a shown in FIG. 23B. Then, impurity diffusion is performed toward the silicon substrate 151 from the etched-away portion, thereby forming an impurity diffusion region 151a shown in FIG. 23C.

In the case where such high temperature processing is performed, a thermal oxide film 153 shown in FIG. 23C is newly formed. In order to produce the waveguide-type photodetector in parallel with the integrated circuit, a SiO$_2$ film 154 is further formed by CVD or the like as shown in FIG. 23D. Then, the resultant laminate is etched to form an opening 155 through the SiO$_2$ film 154 and the thermal oxide film 153 as shown in FIG. 23E. An etching pattern for the first etching (to obtain the SiO$_2$ mask 152a) and an etching pattern for the second etching (to obtain the opening 155) are offset from each other by 2 to 3 μm due to insufficiency in the mask aligning precision and etching precision. Such offset causes a step portion 156 (FIG. 23E).

The photocoupler having the structure shown in FIG. 19 has the following problems. In the case where the adhesive layer 116 is viscous, it is difficult to adjust the amount of the adhesive. In the conventional photocoupler, no good attempt is made for efficiently filling the gap between the prism coupler 96 and the first waveguide layer 113 with an optimum amount of adhesive for the adhesion. There is no specific structure, either, for observing the adhesive which is being put into the gap.

When an excessive amount of adhesive is used, the adhesive overflows and extends onto a side surface of the prism coupler 96 or goes into a holding device (not shown) for the prism coupler 96.

When an insufficient amount of adhesive is used, the adhesive layer 116 contains air bubbles or a space. Since the light is scattered by the air bubbles or the space, the coupling efficiency is lowered.

Moreover, since contraction of the adhesive causes the prism coupler 96 to receive the stress from the adhesive while the prism coupler 96 is being supported by the second gap layer 115, the prism coupler 96 can be undesirably delaminated. Thus, the yield and reliability are lowered.

By the dicing method used for producing a conventional waveguide element, the protection by the protection layer is provided only to the circumferential surface of the waveguide. In the case where the prism adheres before dicing, the surface of the prism is contaminated by the dust generated by dicing, thus decreasing the photocoupling efficiency.

A dielectric layer provided on the substrate on which the integrated circuit is formed for forming a waveguide element has problems in that, when the thickness is not sufficient, the layer below the dielectric layer is exposed in the smoothing process and thus the propagation loss increases due to the contamination and scratches of the surface, resulting in deterioration of the characteristic of the waveguide element.

Moreover, the integrated circuit including a waveguide layer, a buffer layer, a gap layer and the like has serious problems of changing the characteristics of the waveguide element by the film stress and of causing cracks. In order to alleviate the film stress, a layer doped with phosphorus or boron can be provided. However, such a dopant can also undesirably cause a propagation loss.

As described above, a photodetector which copes with the recent demand for high-speed response and high integration has a step portion in the vicinity of the light receiving section thereof. In consideration thereof, production of a so-called waveguide-type photodetector, which includes a waveguide layer provided on the photodetecting section and guides the propagation light to the semiconductor substrate on which the photodetecting section is provided, has problems of difficulty in designing the shape of the buffer layer (dielectric layer) in the vicinity of the step portion and difficulty in precision processing.

With reference to FIG. 24, a practical method for producing the waveguide-type photodetector having the waveguide tapering part M shown in FIGS. 21A and 21B will be described.

In the case where the waveguide-type photodetector has a specific structure, a thermal SiO$_2$ film 161 is first formed by thermal oxidation, and then a buffer layer 162 is provided on the thermal SiO$_2$ film 161. A top surface of the buffer layer 162 needs to be smoothed so as to have such a surface roughness that does not influence the waveguide loss. The buffer layer 162 also needs to be processed so as to have such a shape (including thickness, propagation length, tapering angle, and the like) that allows the loss at the step portion to be ignored. When the surface is not smoothed sufficiently, a step portion H' is formed on the waveguide tapering part M. When the thickness of the buffer layer 162 becomes less than a designed value in the vicinity of the step portion H', the light propagating from left to right in FIG. 24 goes out from a waveguide layer 163 toward a semiconductor substrate 164 or free space. This results in the reduction in the coupling efficiency.

A dielectric material used for the buffer layer 162 may increase the surface roughness of the buffer layer 162 when the buffer layer 162 is formed by a certain method. When the surface roughness is excessively large, such a buffer layer cannot be used in a waveguide element. Etching additionally increases the surface roughness, which causes a serious problem.

In a structure including an optical waveguide and a photodetecting section integrated on a semiconductor substrate, the surface of the photodetecting section formed by impurity diffusion is simply covered by a thin film formed of $SiO_2$ or the like. Accordingly, metal ions entering from outside, especially alkaline ions may undesirably pass through the thin film and reach the diffusion region. In such a case, the charge distribution at the PN junction is adversely influenced, and thus the photodetection function is spoiled.

Only the thin $SiO_2$ layer exists between the photodetecting section and the waveguide layer. Accordingly, when a glass material containing metal ions, for example, #7059 glass produced by Corning, Inc. is used for the waveguide layer, the metal ions contained in the glass may undesirably pass through the $SiO_2$ layer and exert an adverse influence similar to the above.

Glass materials can be freely varied in the optical, thermal, mechanical and electric characteristics and processing method by changing the composition there of. However, application of the glass materials to integrated waveguide elements is significantly restricted by the influences of the metal ions contained in the glass materials.

In the waveguide-type photodetector having the above-described structure, the reduction in the coupling efficiency caused at an interface between the photodetecting section and the $SiO_2$ layer by the light reflection can be a serious problem.

Regarding a polarization splitter, a refraction-reflection type mode splitter shown in FIG. 18 causes a significant difference in the propagating direction of light among different modes. Accordingly, the photodetecting sections provided for the respective modes are positionally discrete. This causes a problem in that different photodetecting sections have different characteristics. In the vicinity of the incident angle which causes total reflection, the reflectance drastically changes. The tolerable range of incident angles is excessively small.

As a solution to these problems in the polarization splitter, a waveguide-type mode splitter is disclosed in Japanese Laid-Open Publication No. 6-82644. The mode splitter disclosed in the above-mentioned publication will be described with reference to FIG. 25.

FIG. 25 is a combination of a plan view and a cross-sectional view of a waveguide-type mode splitter 171. As shown in the part of FIG. 25 which illustrates the cross-sectional structure of the waveguide-type mode splitter 171, the waveguide-type mode splitter 171 includes an optical waveguide layer 173 and a waveguide layer 174 which are provided on a glass substrate 172. The optical waveguide layer 173 is formed of a glass film (#7059, Corning, Inc.) which forms an area B'. The waveguide layer 174 is formed of a $TiO_2$ film which forms an area A'. The two waveguide areas represented by the areas A' and B' which are included in the waveguide-type mode splitter 171 are coupled to each other by a tapering part C' which is tapering sufficiently slowly with respect to the wavelength of the light.

Since the effective indices of the waveguide areas A' and B' are different from each other, each of different modes (TEo mode light and TMo mode light) incident on the tapering part C' at a certain angle are spatially split at an angle of θ' due to the difference between the effective indices of the two areas A' and B'. In the case where the waveguide is formed of, for example, $TiO_2$ as shown in FIG. 25 or non-alkaline glass, the effective indices of the TEo mode light and TMo mode light having a wavelength of 780 nm are as follows.

Area A' TEo: 1.75; TMo: 1.57
Area B' TEo: 1.47; TMo: 1.47

When light is incident from the area A' to the area B' in FIG. 25 at an angle of 45° under these conditions, the refractive angles of the TEo mode light and the TMo mode light are respectively 12.3° and 4.0°. The difference is 8.3° (=12.3–4.0).

In the case of an optical pickup, the oscillation wavelength of a semiconductor laser acting as a light source changes in accordance with the ambient temperature. In order to facilitate the assembly and adjustment of the pickup, the tolerance for attaching the parts of the pickup needs to be sufficiently large. For these reasons, a photocoupler which provides sufficient coupling efficiency despite changes in the wavelength or angle of incidence with a small dependency on the polarization is required. In the case of a prism coupler having no special structure, the diameter of the incident light spot is preferably small in general in order to realize such a photocoupler.

However, it is difficult to maintain a beam diameter as small as several micrometers for a long distance since light tends to be expand due to waves thereof. Accordingly, it is unavoidable that the incident light is converged and that a photocoupler is located at the focal point of the converged light.

The converged light diverges when guided to the optical waveguide. Therefore, the above-described waveguide-type mode splitter which utilizes the difference in the refractive index needs to provide a sufficient splitting angle. A substantial mode splitting angle provided by the waveguide-type mode splitter with respect to the diverging light is: (splitting angle with respect to collimated light)–(total diverging angle of incident light).

In the case of an optical pickup having a semiconductor laser as a light source, the light reflected by the disk is converged to the photodetector at the same angle as the radiation angle from the semiconductor laser unless a numerical aperture conversion lens or the like is added. Such an angle exceeds 10°. When the total diverging angle of light in the optical waveguide is set to 10° in consideration of this fact, a mode splitter providing a splitting angle of 8° cannot split the light.

The mode splitting angle is increased by increasing the number of refractions. However, this method is not preferable because one of the modes is partially totally reflected at the interface between the two areas as the size of the mode splitter excessively increases.

For the above-described reasons, the waveguide-type mode splitter disclosed by Japanese Laid-Open Publication No. 6-82644 has a problem that propagation light having a large diverging angle cannot be split.

As described above, a conventional polarization detection device including a photocoupler, an optical waveguide layer for propagating light from the photocoupler, a polarization splitting section for splitting the propagation light into two components by a difference in the refractive index, and a photodetector formed of a semiconductor material for performing photoelectric conversion on the propagation light obtained as a result of the splitting have various problems to be solved as described above.

SUMMARY OF THE INVENTION

According to one aspect of the invention, a polarization detection device includes a photocoupler; an optical waveguide layer for propagating light from the photocoupler therethrough; a polarization splitter for splitting the propagation light into two components having different refractive angles; and a photodetector formed of a semiconductor material for performing photoelectric conversion on the propagation light split into the two components. The photocoupler, the optical waveguide layer, the polarization splitter, and the photodetector are provided on a single semiconductor substrate. The photocoupler is one of a prism and a beam splitter formed of a dielectric-material and supported by the optical waveguide layer only by an adhesive layer, the adhesive layer having a straight edge in the vicinity of the photocoupler. The adhesive layer has a thickness d fulfilling expression (1) where a longer diameter of a beam spot of the light incident on the photocoupler on an interface between the adhesive layer and the optical waveguide layer is L, and the angle of incidence of the light with respect to the optical waveguide layer is θ:

$$d \geq L/\tan\theta \qquad (1).$$

In one embodiment of the invention, the adhesive layer has a substantially T-shaped pattern including a longitudinal portion extending in a first direction and a transverse portion extending in a second direction perpendicular to the first direction. A length of the longitudinal portion in the first direction is sufficiently longer than a length in the first direction of a contact plane of the photocoupler and the adhesive layer. A length of the transverse portion in the first direction is shorter than a length of the photocoupler in the first direction. A length of the longitudinal direction in the second direction is shorter than a length of the photocoupler in the second direction.

In one embodiment of the invention, the substantially T-shaped pattern has an outside portion outside the photocoupler and a covered portion covered by the photocoupler, and a length of the outside portion in the second direction is shorter than a length of the covered portion in the second direction.

In one embodiment of the invention, a top surface of the photocoupler is optically polished.

In one embodiment of the invention, the photocoupler is adhered on a surface of the optical waveguide layer by the adhesive layer, and an area of the surface of the optical waveguide layer which is adhered to the photocoupler and a bottom surface of the photocoupler are plasma-processed before adhesion.

According to another aspect of the invention, a method for producing a photocoupler includes the steps of securing a plurality of dielectric blocks on an optical waveguide layer provided on a substrate, the plurality of dielectric blocks acting as a coupler prism for exciting waveguide light, and dividing the substrate into areas, respectively, including the dielectric blocks by dicing. A moisture-resistant protection layer is formed on at least one of a light incident plane and a light reflecting plane of the dielectric blocks before dicing and the moisture-resistant protection layer is removed after dicing.

In one embodiment of the invention, the protection layer is formed of a liquid material which contains an organic solvent and forms a polymer film when dried.

In one embodiment of the invention, the protection layer is formed of a photoresist material.

In one embodiment of the invention, the protection layer is formed after the dielectric blocks are secured to the substrate.

According to still another aspect of the invention, a polarization detection device includes a photocoupler; an optical waveguide layer for propagating light from the photocoupler therethrough; a polarization splitter for splitting the propagation light into two components having different refractive angles; and a photodetector formed of a semiconductor material for performing photoelectric conversion on the propagation light split into the two components. The photocoupler, the optical waveguide layer, the polarization splitter, and the photodetector are provided on a single semiconductor substrate. The semiconductor substrate and the optical waveguide layer are separated from each other by a dielectric layer having a thickness greater than a thickness of a portion of a combination of the photodetector and an integrated circuit adjacent to the photodetector, the portion being highest from the single semiconductor substrate, and the dielectric layer is set to have such a thickness so as to allow the dielectric layer to act as a buffer layer.

In one embodiment of the invention, the dielectric layer is formed of one of a single NSG (non-doped silicate glass), layer and a laminate including the single NSG layer.

In one embodiment of the invention, the dielectric layer is formed of one of a single PSG (phosphosilicate glass). layer, a single BPSG (boron-doped phospho-silicate glass), layer, and a laminate including one of the single PSG layer and the single BPSG layer.

According to still another aspect of the invention, a polarization detection device includes a photocoupler; an optical waveguide layer for propagating light from the photocoupler therethrough; a polarization splitter for splitting the propagation light into two components having different refractive angles; and a photodetector formed of a semiconductor material for performing photoelectric conversion on the propagation light split into the two components. The photocoupler, the optical waveguide layer, the polarization splitter, and the photodetector are provided on a single semiconductor substrate. The photodetector is a photoelectric converter having an impurity diffusion region formed in the semiconductor substrate, an optical waveguide element including the optical waveguide layer is provided above the photoelectric converter with the dielectric layer interposed therebetween, and a part of the optical waveguide layer and the impurity diffusion region are included in a light receiving region where photocoupling is allowed to occur. The light receiving region includes a tapered portion including a part of the dielectric layer having a gradually decreasing thickness and the optical waveguide layer provided on the part of the dielectric layer.

In one embodiment of the invention, the tapered portion has a smooth top surface without any bending edge and a maximum sloping angle of about 10 degrees.

In one embodiment of the invention, the dielectric layer is set to have such a thickness as to allow the dielectric layer to act as a buffer layer in the light receiving region in the vicinity of an end of the impurity diffusion region, and the dielectric layer has a tapering end having a thickness of about zero in the impurity diffusion region.

In one embodiment of the invention, the light receiving region has an area over a distance of at least 20 μm, and is adjacent to the tapering end of the dielectric layer, where the thickness of the dielectric layer is about zero.

In one embodiment of the invention, a protection layer is provided at least one of between the photoelectric converter having the impurity diffusion region and the dielectric layer and between the photoelectric converter in the light receiving region and the optical waveguide layer in the light receiving region.

In one embodiment of the invention, the protection layer is formed of silicon nitride obtained as a result of low-pressure CVD.

In one embodiment of the invention, the polarization detection device further includes an anti-reflection layer provided between the photoelectric converter and the dielectric layer in the light receiving region, and the optical waveguide layer in the light receiving region, the anti-reflection layer acting on incident light having an angle of incidence θi, which is defined by $\theta i = \sin^{-1}(n_b/ngl)$, where the refractive index of a lowermost layer of the optical waveguide layer is ngl and the refractive index of the dielectric layer is $n_b$.

In one embodiment of the invention, the antireflection layer is formed of silicon nitride obtained as a result of plasma CVD.

In one embodiment of the invention, an area surrounded by a step portion formed when the impurity diffusion layer is larger than the light receiving region; and a photocoupling section, the optical waveguide layer and the polarization splitter of the photocoupler and the entirety of the photodetector are provided in an area corresponding to the area surrounded by the step portion.

According to still another aspect of the invention, a polarization detection device includes a photocoupler; an optical waveguide layer for propagating light from the photocoupler therethrough; a polarization splitter for splitting the propagation light into two components having different refractive angles; and a photodetector formed of a semiconductor material for performing photoelectric conversion on the propagation light split into the two components. The photocoupler, the optical waveguide layer, the polarization splitter, and the photodetector are provided on a single semiconductor substrate. The optical waveguide layer is provided on the dielectric layer, an interconnection and an integrated circuit are adjacent to the photodetector, and the interconnection and a metal layer of the integrated circuit are not exposed at a higher level than the level of a top surface of the dielectric layer.

According to still another aspect of the invention, a polarization detection device includes a photocoupler; an optical waveguide layer for propagating light from the photocoupler therethrough; a polarization splitter for splitting the propagation light into two components having different refractive angles; and a photodetector formed of a semiconductor material for performing photoelectric conversion on the propagation light split into the two components. The photocoupler, the optical waveguide layer, the polarization splitter, and the photodetector are provided on a single semiconductor substrate. The optical waveguide layer includes a tapered portion having a thickness gradually changing in a direction of light propagation. The polarization splitter includes a high refractive index region formed by patterning, and is provided between the photocoupler and the optical waveguide layer so that the tapered portion is positioned around the polarization splitter.

In one embodiment of the invention, the optical waveguide layer is provided on the dielectric layer, and the high refractive index region is formed of a high refractive index material provided between the optical waveguide layer and the dielectric layer.

In one embodiment of the invention, the polarization splitter has such a shape as to split the propagation light into two components substantially parallel to a direction of the light propagation and propagate the two components in different directions, and allows the two components to be refracted a plurality of times by the high refractive index region.

In one embodiment of the invention, the polarization splitter has such a shape as to split the propagation light into four components substantially parallel to a direction of the light propagation and propagate the four components in different directions, and allows the four components to be refracted a plurality of times by the high refractive index region.

In one embodiment of the invention, the polarization splitter has such a shape as to refract the propagation light split into two or four components in a direction distanced from the center of the propagation light before split.

In one embodiment of the invention, the polarization splitter has such a shape that four components obtained by splitting the propagation light include two inner components and two outer components, and the two inner components are refracted at a larger angle than the two outer components.

As described above, according to the polarization detection device of the present invention, the prism or the beam splitter acting as a photocoupler is supported on the optical waveguide layer only by the adhesive layer having a straight edge surface. Therefore, a low-priced photocoupler which is produced without high processing precision can be used. Furthermore, the structure between the prism or beam splitter and the optical waveguide layer is simplified, and the influence of a stress is alleviated by contraction of the adhesive. In consequence, unexpected delamination of the photocoupler does not occur, thus improving the reliability.

Where the longer diameter of a beam spot (of the light incident on the photocoupler) on an interface between the adhesive layer and the optical waveguide layer is L, and the angle of incidence of the light with respect to the optical waveguide layer is θ, the thickness of the adhesive layer d is at least L/tan θ. Accordingly, the adhesive layer does not act as a thin film, and thus multiple reflections do not occur. Since optical loss caused by the multiple reflections is suppressed, the coupling efficiency is improved.

The adhesive layer can have a substantially T-shaped pattern including a longitudinal portion extending in a first direction and a transverse portion extending in a second direction perpendicular to the first direction. The substantially T-shaped pattern can have a structure, in which a length of the longitudinal portion in the first direction is sufficiently longer than a length in the first direction of an adhesion plane of the prism or the beam splitter acting as the photocoupler and the adhesive layer. A length of the transverse portion in the first direction is shorter than a length of the photocoupler in the first direction, and a length of the longitudinal portion in the second direction is shorter than a length of the one-chip photocoupler in the second direction. In such a case, the prism or the beam splitter is efficiently supported by an appropriate amount of adhesive. Thus, an adverse influence by extra adhesive is avoided.

The substantially T-shaped pattern can have an outside portion outside the prism or the beam splitter and a covered portion covered by the prism or the beam splitter. In the case where a length of the outside portion in the second direction is shorter than a length of the covered portion in the second direction, the substantially T-shaped pattern is filled with the adhesive efficiently.

In the case where a top surface of the prism or the beam splitter is optically polished, the filling process of the substantially T-shaped pattern with the adhesive can be observed. Accordingly, the filling process is performed efficiently and accurately.

In the case where an area of the surface of the optical waveguide layer which adheres to the prism or the beam splitter and a bottom surface of the prism or the beam splitter are plasma-processed before adhesion, the adhesiveness therebetween is increased.

By forming the protection layer which is moisture-resistant on at least one of the light incident plane and a light reflecting plane of the prism coupler before dicing and removing the protection layer after dicing as described above, adhesion of the dust to the light incident plane of the prism coupler is avoided. Accordingly, the decline in the photocoupling efficiency of the polarization detection device is restricted, and thus the characteristics of the polarization detection device are stabilized.

In the case where the protection layer is formed of a liquid material containing an organic solvent, a polymer coat is formed by drying of the protection layer. Such a liquid material facilitates the formation and removal of the protection layer, which improves the workability. Especially by forming the protection layer of a photoresist material, the protection layer is removed by a resist remover which is compatible with a photographic process. Therefore, the workability is improved.

Since the prism coupler is secured to the upper clad layer, positioning of the small-diameter tube is facilitated. Since the protection layer is formed on the prism coupler after the prism coupler is secured to the upper clad layer, the protection layer material does not come into the adhesion plane of the prism coupler which is to adhere to the upper clad layer. Therefore, defective adhesion does not occur between the prism coupler and the upper clad layer.

According to the present invention, a moisture-resistant protection layer is formed on at least one of a light incident plane and a light reflecting plane of the dielectric blocks before dicing and the moisture-resistant protection layer is removed after dicing. By such a method, dust is prevented from adhering to the light incident plane of the dielectric blocks, thus suppressing the decline in the photocoupling efficiency and stabilizing the characteristics of the polarization detection device.

In the case where the protection layer is formed of a liquid material which contains an organic solvent and forms a polymer coat when dried, the formation and removal of the protection layer is facilitated, thus improving the workability.

In the case where the protection layer is formed of a photoresist material, the protection layer is removed by a resist remover which is compatible with a photographic process. Thus, the workability is improved.

In the case where the protection layer is formed after the dielectric blocks are secured to the substrate, the dielectric blocks a re easily held, and moreover, the protection layer material is prevented from coming into the adhesion plane of the dielectric blocks. Thus, the workability is improved.

According to the present invention, the semiconductor substrate and the optical waveguide layer are separated from each other by a dielectric layer having a thickness greater than a thickness of a highest portion of a combination of the photodetector and an integrated circuit, and the dielectric layer is set to have such a thickness so as to allow the dielectric layer to act as a buffer layer. Therefore, the lower layers are prevented from being exposed during the processing. Thus, the propagation loss in the optical waveguide layer is not adversely influenced, and the coupling efficiency is improved.

In the case where the dielectric layer is formed of one of a single NSG layer and a laminate including the single NSG layer, the dopant contained in the dielectric layer does not absorb the propagation light. For this reason also, the coupling efficiency is improved.

In the case where the dielectric layer is formed of one of a single PSG layer, a single BPSG layer, and a laminate including one of the single PSG layer and the single BPSG layer, the film stress of the dielectric layer is alleviated. Thus, changes in the characteristics of the polarization detection device and the generation of cracks are suppressed.

According to the present invention, a photoelectric converter having an impurity diffusion region is formed in the semiconductor substrate, an optical waveguide element including the optical waveguide layer is provided above the photoelectric converter with the dielectric layer interposed therebetween, and a part of the optical waveguide layer and the impurity diffusion region are included in a light receiving region where photocoupling is allowed to occur, and the light receiving region includes a tapered portion including a part of the dielectric layer having a gradually decreasing thickness and the optical waveguide layer provided on the part of the dielectric layer. Therefore, the propagation loss is reduced, and so the photocoupling efficiency is improved.

In the case where the tapered portion has a smooth top surface without any bending edge and a maximum sloping angle of about 10 degrees, the photocoupling efficiency is further improved.

The dielectric layer can be set to have such a thickness so as to allow the dielectric layer to act as a buffer layer in the light receiving region (where photocoupling can occur) in the vicinity of an end of the impurity diffusion region, and the dielectric layer can be a tapering end having a thickness of zero in the impurity diffusion region. In such a case, the propagation light is efficiently guided to the photodetecting section.

In the case where the light receiving region has an area over a distance of at least 20 $\mu$m, adjacent to the tapering end of the dielectric layer, where the thickness of the dielectric layer is zero, the coupling of the propagation light to the photodetecting section is facilitated.

In the case where a protection layer is provided at least one of between the photoelectric converter having the impurity diffusion region and the dielectric layer and between the photoelectric converter in the light receiving region and the optical waveguide layer in the light receiving region, invasion of contaminants is prevented, and thus adverse influences of the external contaminants on the photoelectric converter and the integrated circuit and damages caused thereto during the processing are suppressed.

In the case where the protection layer is formed of silicon nitride obtained as a result of low-pressure CVD, the polarization detection devices obtain satisfactory characteristics and are produced at a high productivity.

The device may include an anti-reflection layer which acts on incident light having an angle of incidence $\theta i$, which is defined by $\theta i = \sin^{-1}(n_b/ngl)$, with respect to the line vertical to the dielectric layer on or the optical waveguide layer, where ngl is the refractive index of a lowermost layer of the optical waveguide layer and $n_b$ is the refractive index of the dielectric layer. In this case, the coupling efficiency of the propagation light to the photoelectric converter is improved while restricting damage to the device during the processing further efficiently. The reason will be described below.

Photocoupling mainly occurs in the vicinity of cut-off ("cut-off" refers to a phenomenon that the propagation light is not in a waveguide mode anymore, i.e., the propagation toward the semiconductor device increases). The effective refractive index of the optical waveguide with respect to the propagation light in the vicinity of the cut-off (i.e., phase constant÷wave number) is a value in the vicinity of the refractive index $n_b$ of the dielectric layer. That is, $n \approx n_b$.

From such a relationship, when the propagation light is directed from the optical waveguide layer to the light receiving section, the angle of incidence θi based on a line perpendicular to the lowermost layer of the optical waveguide layer or the dielectric layer is given by θi=sin$^{-1}$(n$_b$/ngl). Accordingly, where a series of layers act as an anti-reflection layer for the light incident at this angle, highly efficient photocoupling is realized.

In the case where the anti-reflection layer is formed of silicon nitride obtained as a result of plasma CVD, the polarization detection devices obtain satisfactory characteristics and are produced at a high productivity, the coupling efficiency of the propagation light to the photoelectric converter is improved while restricting damages during the processing still further efficiently.

An area surrounded by a portion formed when the impurity diffusion layer can be larger than the light receiving region; and a photocoupling section, the optical waveguide layer and the polarization splitter of the photocoupler and the entirety of the photodetector can be provided in an area corresponding to the area surrounded by the step portion. In such a case, the waveguide light does not pass above the step portion, and so the problems caused by the step portion to designing and processing of the photodetecting section are eliminated. Therefore, the conventionally-structured waveguide-type photodetector having a tapering waveguide layer can be applied to the photodetector conformed to the demands of high-speed response and high integration.

According to the present invention, the interconnection and a metal layer of the integrated circuit adjacent to the photodetecting section are not exposed at a higher level than the level of a top surface of the dielectric layer. Therefore, even when another dielectric layer is added during the processing, the lower layer is not exposed. Thus, the propagation loss in the optical waveguide layer is not adversely influenced.

According to the present invention, the polarization splitter includes a high refractive index region formed by patterning, and is provided between the photocoupler and the optical waveguide layer so that the tapered portion is positioned around the polarization splitter. Therefore, the propagation loss caused at the border between the photocoupler and the optical waveguide layer is suppressed, thus improving the coupling efficiency. Propagation light can be split so as to provide both satisfactory convergency and a large diverging angle.

In the case where the high refractive index region is formed of a high refractive index material provided between the optical waveguide layer and the dielectric layer, the refractive index region is protected against adverse influences of, for example, contamination.

The polarization splitter can have such a shape so as to split the propagating light into two components substantially parallel to a direction of the light propagation and propagate the two components in different directions, and to allow the two components to be refracted a plurality of times by the high refractive index region. In such a case, even when the propagation light is diverging light having a large diverging angle, the diverging angle is reduced after refraction. Thus, the substantial mode splitting angle is increased.

The polarization splitter can have such a shape as to split the propagating light into four components substantially parallel to a direction of the light propagation and propagate the four components in different directions, and to allow the four components to be refracted a plurality of times by the high refractive index region. In such a case, even when the propagation light is diverging light having a large diverging angle, the diverging angle is further reduced after refraction. Thus, the substantial mode splitting angle is increased. The propagation distance of the mode light is shortened.

The polarization splitter can have such a shape as to refract the propagating light split into two or four components in a direction distanced from the center of the propagating light before split. In such case, spatial crossing of polarization of different modes does not occur. Therefore, splitting and detection of the polarization are performed accurately.

The polarization detection device can have such a shape that four components obtained by splitting the propagation light include two inner components and two outer components. The two inner components are refracted at a larger angle than the two outer components. In such a case, the number of photodetecting sections to which the propagation light is guided is reduced. Therefore, the characteristic deviation is restricted.

Thus, the invention described herein makes possible the advantages of (1) providing a polarization detection device having a low-priced, highly efficient and highly reliable photocoupler including a prism or beam splitter, which is mounted and supported with a strong adhesion only by an adhesive layer having an appropriate shape so as to be less influenced by a stress; (2) providing a polarization detection device including a dielectric layer acting also as a buffer layer provided between an optical waveguide layer and a semiconductor substrate, the dielectric layer having little influence on an integrated circuit and the like via a film stress, light absorption and by preventing a lower layer from being exposed during processing; (3) providing a polarization detection device including an optical waveguide layer which suppresses propagation loss, allows various materials to be used for the dielectric layer, and realizes photocoupling with a photodetector conforming to a high-speed response and high integration; (4) providing a polarization detection device including a highly efficient and highly reliable photodetector which suppresses adverse influences on the integrated circuit by external contaminants and propagation loss by reflection of the coupled light; and (5) providing a polarization detection device including a polarization splitter having satisfactory characteristics for efficiently splitting propagation light having satisfactory convergency and a large diverging angle.

These and other advantages of the present invention will become apparent to those skilled in the art upon reading and understanding the following detailed description with reference to the accompanying figures.

BRIEF DESCRIPTION OF THE DRAWINGS

FIG. 4A is a partial isometric view of the polarization detection device in the first example before a lengthy prism coupler having a trapezoidal cross-section is mounted;

FIG. 4B is a partial isometric view of the polarization detection device in the first example after the lengthy prism coupler having a trapezoidal cross-section is mounted;

FIG. 7A is a side view of the polarization detection device in the first example using a prism having a parallelogram cross-section as a photocoupler;

FIG. 7B is a side view of the polarization detection device in the first example using a prism having an inverted trapezoidal cross-section as a photocoupler;

FIG. 7C is a side view of the polarization detection device in the first example using a beam splitter as a photocoupler;

FIGS. 8A through 8G are cross-sectional views illustrating a process for forming a tapering portion in the polarization detection device in the first example using wet etching;

FIG. 21A is a cross-sectional view of a conventional photodetector;

FIG. 21B is a cross-sectional view of another conventional photodetector;

FIGS. 23A through 23E are cross-sectional views illustrating a method for producing a conventional photodetector having a step portion;

DESCRIPTION OF THE PREFERRED EMBODIMENTS

Hereinafter, the present invention will be described by way of illustrative examples with reference to the accompanying drawings.

EXAMPLE 1

FIGS. 1 through 9 show a polarization detection device in a first example according to the present invention. With reference to FIGS. 1 through 9, a general structure and operation of the polarization detection device in the first example will be described.

Figure 1:
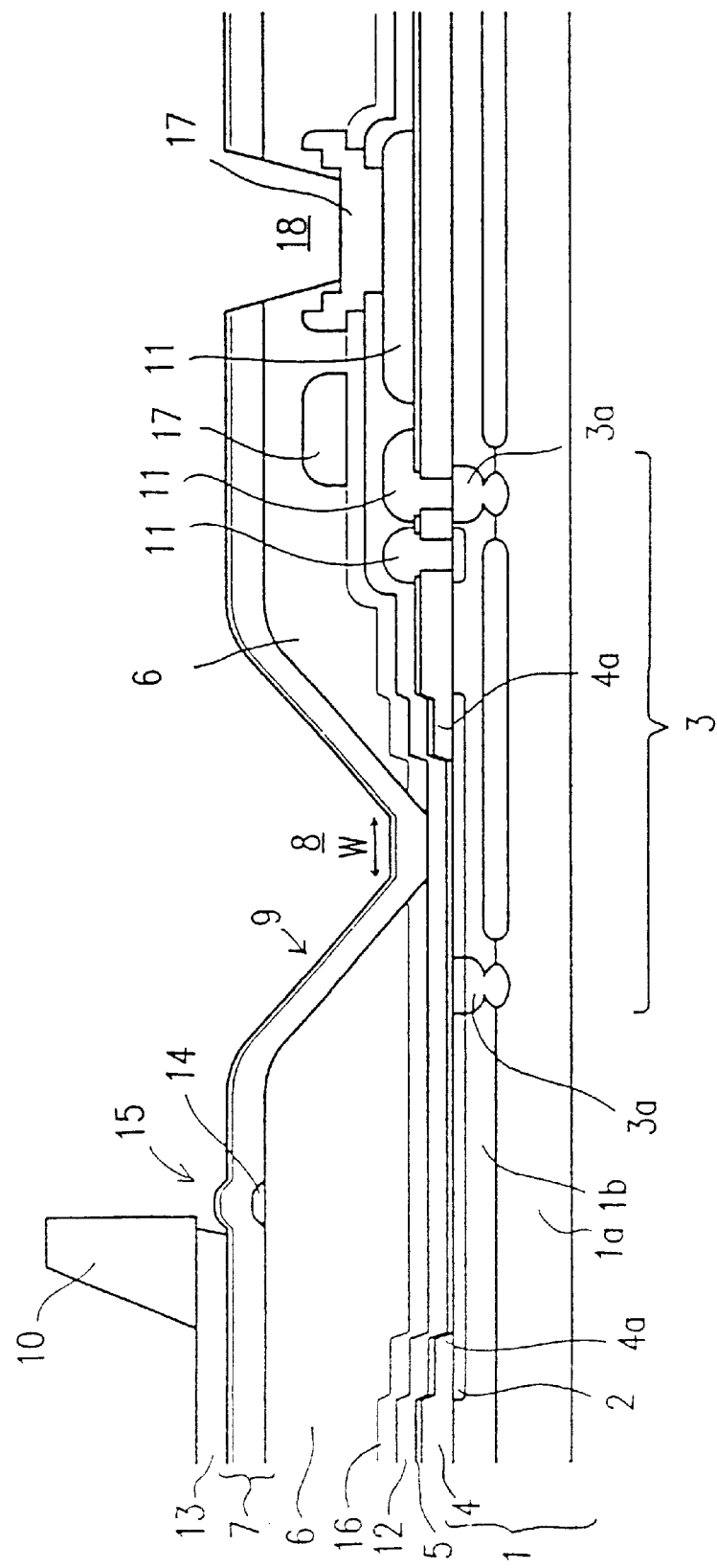
FIG. 1 is a cross-sectional view of a polarization detection device in a first example according to the present invention.

As shown in FIG. 1, a photoelectric converter 3 having an impurity diffusion region 2 is provided on a semiconductor substrate 1. A step portion 4a generated by etching a thermal $SiO_2$ film 4 for impurity diffusion remains as shown on the left and right ends of the impurity diffusion region 2. A protection layer 5 for preventing contaminants from entering the polarization detection device and an anti-reflection layer 12 are provided on the thermal $SiO_2$ layer 4. In this specification, the terms "right" and "left" refer to the right and left in the sheet of the corresponding figure.

A dielectric layer (buffer layer) 6 is provided above the anti-reflection layer 12 with an interlayer film 16 being interposed therebetween. An end portion of the dielectric layer 6 indicated by reference numeral 9 is tapered. The tapered portion has a thickness gradually decreasing in a light propagating direction. A right end of the tapered portion of the dielectric layer 6 is above the right end of the impurity diffusion region 2. To the right of the right end of the tapered portion of the dielectric layer 6, there is an area where the dielectric layer 6 does not exist, and another dielectric layer 6 is provided to the right of that area. The another dielectric layer 6 has a thickness gradually increasing in the light propagating direction.

An optical waveguide layer 7 is provided so as to cover the dielectric layers 6 and the anti-reflection layer 12. The optical waveguide layer 7 has a sloping portion also indicated by reference numeral 9 along the tapered portion of the dielectric layer 6. Although the optical waveguide layer 7 itself is not tapered, the sloping portion will be sometimes referred to as the tapered portion 9 for simplicity. For easier explanation, a combination of the tapered portion of the dielectric layer 6 and the sloping portion of the optical waveguide layer 7 is also referred to as the "tapered portion 9". A flat area where the dielectric layer 6 does not exist acts as a light receiving region 8 where photocoupling can occur. A flat area of the optical waveguide layer 7 above the flat area without the dielectric layer 6 is included in the light receiving region 8.

The dielectric layer 6 and the optical waveguide layer 7 are flat to the left of the tapered portion 9. On this flat portion, a prism coupler 10 for coupling the light reflected by the magneto-optic information recording medium (not shown) to the optical waveguide layer 7 is secured by an adhesive layer 13.

A high refractive index material layer 14 is sandwiched between the dielectric layer 6 and the optical waveguide layer 7, at a position between the prism coupler 10 and the light receiving region 8 and proximate to the prism coupler 10. An area of the optical waveguide layer 7 positionally corresponding to the high refractive index material layer 14 is raised, and a polarization splitter 15 is provided in the raised portion.

As shown in FIG. 1, an area surrounded by the step portion 4a around the light receiving region 8 of a photodetecting section formed on the semiconductor substrate 1 is larger than the light receiving region 8. Provided above the area surrounded by the step portion 4a are an optical waveguide element including the protection layer 5, the anti-reflection layer 12 and the optical waveguide layer 7 laminated above the anti-reflection layer 12 with the dielectric layer 6 interposed therebetween, the prism coupler 10, the polarization splitter 15 and the light receiving region 8. As can be appreciated from this, elements which have functions for propagating light are provided above the area surrounded by the step portion 4a.

The thermal $SiO_2$ layer 4 and the protection layer 5 have openings running therethrough to the right of the light receiving region 8. Interconnections 11 from the photoelectric converter 3 are taken out to above the protection layer 5 through the openings. The interconnections 11 are provided for connecting the photoelectric converter 3 to an integrated circuit (not shown) for processing an electric signal obtained by photoelectric conversion performed by the photoelectric converter 3. An upper layer wire 17 is provided above and separated from the interconnections 11 by the anti-reflection layer 12 and the interlayer film 16. The anti-reflection layer 12 also insulates the interconnections 11 from the upper layer wire 17.

The interconnections 11 and the upper layer wire 17 are formed in parallel with (i.e. at the same time as) the integrated circuit. The interlayer film 16 is provided for smoothing the interconnections 11. The interlayer film 16 can be formed of, for example, SOG (spin on glass) and PSG (phospho-silicate glass). Accordingly, the interlayer film 16 has the same function in the light propagation path as that of the dielectric layer 6 described later.

Still referring to FIG. 1, another upper layer wire 17 is partially in contact with the interconnection 11 as a result of elimination of the anti-reflection layer 12 and the interlayer film 16. The dielectric layer 6 and the optical waveguide layer 7 have an opening running therethrough in positional correspondence with the direct contact of the upper layer wire 17 and the interconnection 11. The bottom of the opening acts as an electrode pad 18. The upper electrode layer 17 acts as an upper electrode layer for the interconnections 11 and a light shielding layer for the integrated circuit.

Hereinafter, the operation of the polarization detection device shown in FIG. 1 will be described.

The light reflected by the magneto-optic information recording medium (not shown) is incident on the optical waveguide layer 7 through the prism coupler 10 to become waveguide light. The waveguide light propagates from left to right through the optical waveguide layer 7 which is separated from the semiconductor substrate 1, the protection layer 5 and the anti-reflection layer 12 by the dielectric layer 6. Then, the waveguide light is guided to the light receiving region 8 of the photodetecting section via the tapered portion 9 with no optical loss. The guided light reaches the photoelectric converter 3 at a high efficiency due to the function of the anti-reflection layer 12.

Next, an electric signal obtained as a result of the photoelectric conversion performed by the photoelectric converter 3 via the light receiving region 8 is sent to the integrated circuit by the interconnections 11 to be processed. The interconnections 11 are covered by the light shielding layer, namely, the upper layer wire 17, except for an area of the interconnections which is located within the photoelectric converter 3 and thus is involved in photoelectric conversion. Thus, photoelectric conversion is prevented from being performed in an area where photoelectric conversion is not necessary. The signal processed by the integrated circuit is guided to the electrode pad 18 through the interconnections 11 and connected to an external device by a wire (not shown) bonded thereto and formed of gold, Al(Si) or the like.

Next, characteristic parts of the polarization detection device in the first example will be described.

As shown in FIG. 1, the impurity diffusion region 2 is formed to be sufficiently large to allow a left part (light incident side) of the step portion 4a (left in FIG. 1) to be outside the photoelectric converter 3, and a plurality of separate electrodes 3a are formed in prescribed positions in the impurity diffusion region 2 in a dispersed manner. The plurality of separate electrodes 3a define a segment of the photodetecting section.

More specifically, the semiconductor substrate 1 includes a P-type Si substrate 1a and an N-type silicon layer 1b epitaxially grown on the P-type Si substrate 1a. The impurity diffusion region 2 and the separate electrodes 3a formed in the semiconductor substrate 1 are $P^+$ regions having a higher impurity concentration than that of the P-type Si substrate 1a.

As can be understood from the position at which the prism coupler 10 is secured, the waveguide light does not pass above the step portion 4a in the light propagation path from the light incident point of the optical waveguide layer 7 below the prism coupler 10 to the light receiving region 8. Accordingly, problems related to designing and processing the dielectric layer 6 and the photodetecting section by the step portion 4a are eliminated. As a result, the structure of a waveguide-type photodetector having a conventional tapered portion can be applied to a polarization detection device provided so as to fulfill the demands of high-speed response and high integration. Thus, the characteristics of the polarization detection device are improved and higher performance is realized.

For example, in the case where the light propagation path from the prism coupler 10 to the light receiving region 8 through the optical waveguide layer 7 is formed in an area surrounded by the step portion 4a, the step of smoothing the surface of the thermal $SiO_2$ so as to have such a surface roughness that does not influence the waveguide loss can be eliminated.

The protection layer 5 provided between the photodetecting section/integrated circuit and the anti-reflection layer 12 suppresses the influence of contaminants contained in the material for the optical waveguide layer 7 and contaminants entering from outside through the optical waveguide layer 7. The protection layer 5, which is formed of silicon nitride as a result of low-pressure CVD, shields contaminants entering the photoelectric converter 3 and the integrated circuit provided on the semiconductor substrate 1. In the conventional bulk-type photodetector, the thickness of the protection layer 5 is greater since the protection layer 5 also acts as an anti-reflection layer. In the first example, the protection layer 5 has a thickness of about 0.1 μm.

The dielectric layer 6 is preferably formed of NSG (non-doped silicate glass), SOG, PSG, or BPSG (boron-doped phospho-silicate glass), or a laminate of these materials. In such a case, the film stress is alleviated to suppress the generation of cracks, and the characteristics of the polarization detection device are improved.

The thickness of the dielectric layer 6, which also acts as a buffer layer, needs to be sufficient to prevent light absorption into the semiconductor substrate 1. A thickness of about 2 μm is sufficient for such a purpose. In the first example, the thickness needs to be, for example, at least 3 μm in order to prevent the upper layer wire 17 and the electrode pad 18 from being externally exposed. A part of the dielectric layer 6 which is over, for example, the left upper layer wire 17 in FIG. 1 projects and is squared, and thus the thickness of this part of the dielectric layer 6 reduces faster than the rest of the dielectric layer 6 by polishing for tapering the dielectric layer 6. Accordingly, the part of the dielectric layer 6 over, for example, the left upper layer wire 17 is initially formed to have a thickness of 5 μm so that the dielectric layer 6 has a thickness of 4 μm after polishing (1 μm above the upper layer wire 17).

The anti-reflection layer 12 is provided between the protection layer 5 and the dielectric layer 6 and between the photoelectric converter 3 and the optical waveguide layer 7 in the light receiving region 8. The anti-reflection capability of the anti-reflection layer 12 efficiently couples propagation light to the photodetecting section. In this manner, the coupling efficiency is improved.

The anti-reflection layer 12 also acts as a stop point when forming the opening in the dielectric layer 6 and the interlayer film 16 in the light receiving region 8. The anti-reflection layer 12, which is formed of silicon nitride as a result of low-pressure CVD, therefore has a function of an etching stop layer.

Since the anti-reflection layer 12 improves the coupling efficiency and the processing precision in this manner, the polarization detection device has improved characteristics and reliability.

Figure 2A:
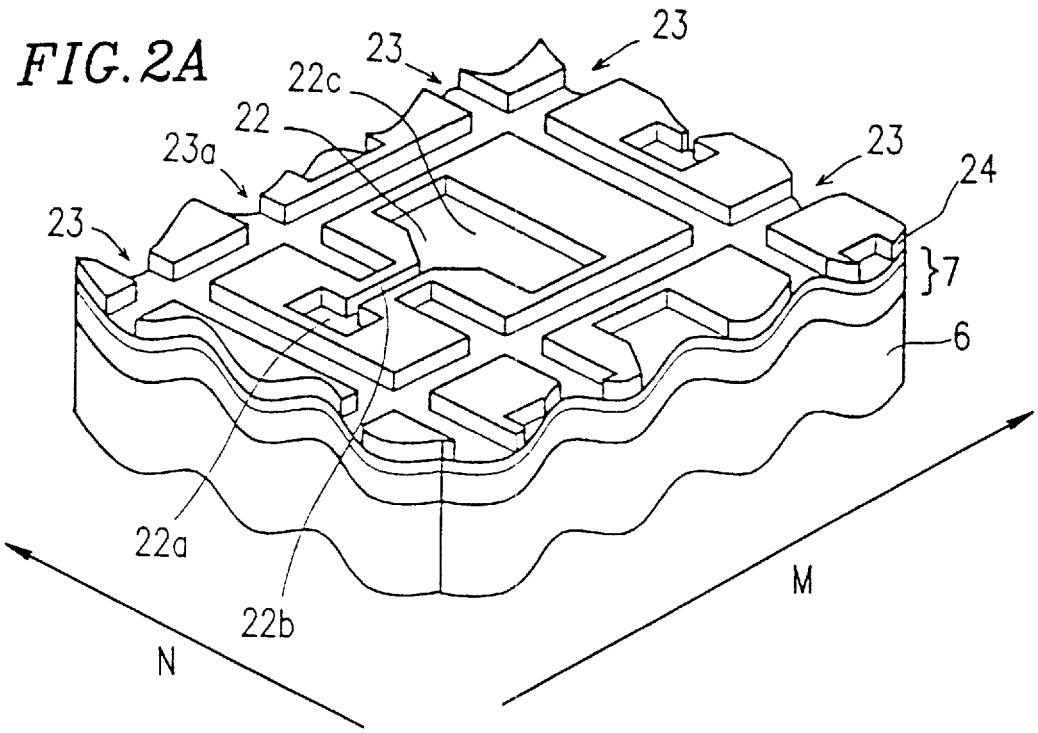
FIG. 2A is a partial isometric view of the polarization detection device in the first example before a prism coupler having a trapezoidal cross-section is mounted.
Figure 2B:
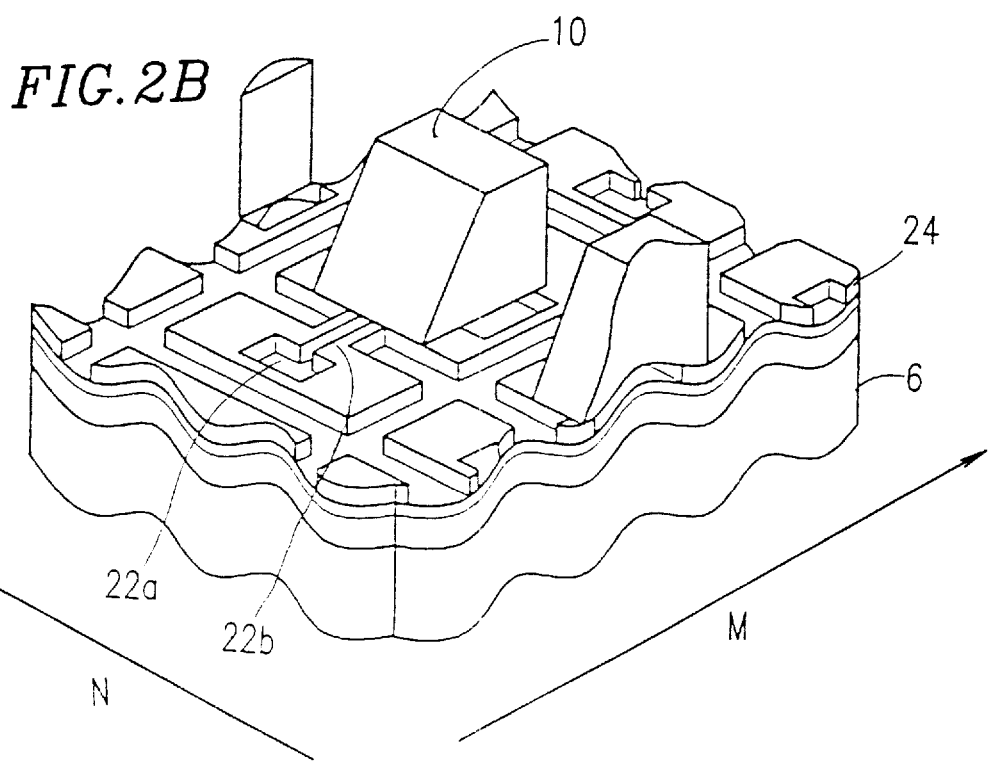
FIG. 2B is a partial isometric view of the polarization detection device in the first example after the prism coupler having a trapezoidal cross-section is mounted.

Another feature of the polarization detection device in the first example is a structure for supporting the prism coupler 10. Such a structure will be described in detail with reference to FIGS. 2A and 2B. In FIGS. 2A and 2B, the polarization splitter, the photodetection section and the integrated circuit are omitted, and the adhesive layer (indicated by reference numeral 13 in FIG. 1) is shown as having a greater thickness than in FIG. 1 for clarity.

Figure 3:
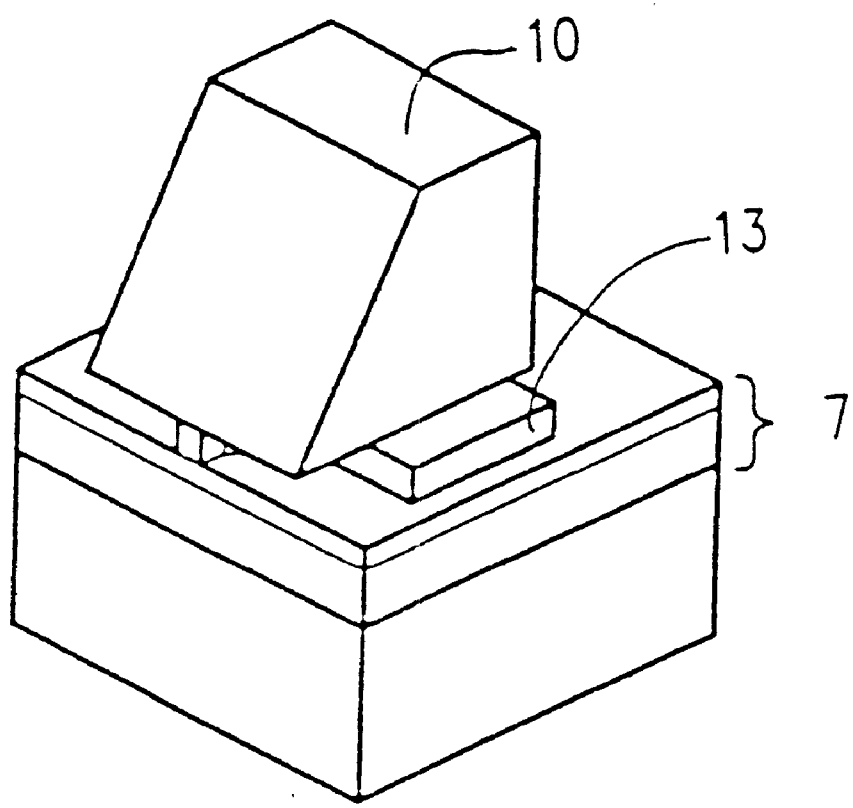
FIG. 3 is an isometric view of the polarization detection device shown in FIGS. 2A and 2B in the form of a one-chip device.

In the polarization detection device in the first example (FIG. 1), the prism coupler 10 is supported only by the adhesive layer 13. Such a structure is formed in the following manner. The prism coupler 10 having a trapezoidal cross-section is put on a top surface of a photoresist layer 24 as shown in FIG. 2B. As shown in FIG. 2A, the photoresist layer 24 has a substantially T-shaped pattern 22 formed therein. The top surface of the prism coupler 10 is optically polished. The substantially T-shaped pattern 22 is filled with an adhesive, and the adhesive is cured. Then, the substrate is cut into chips each including one prism coupler 10. Then, the photoresist layer 24 is removed. Thus, the prism coupler 10 supported by the adhesive layer 13 is produced as illustrated in FIG. 3.

The structure will be described in detail. FIG. 2A is a partial isometric view of the photoresist layer 24 provided on the optical waveguide layer 7 which overlies the dielectric layer 6, which is formed above the semiconductor substrate 1.

As shown in FIG. 2A, the photoresist layer 24 has the substantially T-shaped pattern 22 and a lattice pattern 23 formed therein. The lattice pattern 23 is formed around the substantially T-shaped pattern 22. The patterns 22 and 23 are formed by, for example, performing contact exposure and development using the same mask for both steps.

The lattice pattern 23 is provided to prevent the photoresist 24 from interfering with a blade used for dicing the substrate into chips. The width of the lattice pattern 23 is therefore preferably greater than the thickness of the blade. Namely, the photoresist layer 24 is removed in such a width. Since such a structure prevents the photoresist layer 24 from interproved.

The photoresist layer 24 also has a linear pattern 23a so as to cross the substantially T-shaped pattern 22. The linear pattern 23a is provided for the same purpose as that of the lattice pattern 22, but is interrupted in the middle by an adhesive passage 22b.

As shown in FIGS. 2A and 2B, the substantially T-shaped pattern 22 includes a first portion 22a, a second portion 22b (a longitudinal portion) which is the adhesive passage, and a third portion 22c (a transverse portion). A length of the third portion 22c in a second direction indicated by arrow N is longer than a length of an adhesion plane (bottom plane) of the prism coupler 10 in the second direction N. A length of the substantially T-shaped pattern 22 in a first direction indicated by arrow M is sufficiently longer than the adhesion plane in the first direction M. A length of the third portion 22c in the first direction is shorter than a length of the prism coupler 10 in the first direction. A length of the second portion 22b in the second direction is shorter than a length of the prism coupler 10 in the second direction. The first portion 22a is longer in the second direction than in the first direction.

The first portion 22a acts as an adhesive injection portion, and the second portion 22b acts as the adhesive passage as described above. The adhesive injection portion 22a is provided for preventing the adhesive provided to the substantially T-shaped pattern 22 from expanding more than necessary, and the adhesive passage 22b is provided for efficiently introducing the adhesive.

In general, an adhesive extends faster on walls of the photoresist layer 24 than on the top surface of the optical waveguide layer 7 due to wetting thereof. Accordingly, without the adhesive injection portion 22a, the adhesive extends fast only along the walls of the photoresist layer 24, and does not extend to the entirety of the substantially T-shaped pattern 22.

Since the length of the third portion 22c in the second direction N is longer than the length of the prisms coupler 10 in the second direction, the portion of the third portion 22c which is not covered by the prism coupler 10 acts as a gas escaping portion. Without the gas escaping portion, the gas inside the substantially T-shaped pattern 22 cannot escape outside, which decreases the immersion efficiency of the adhesive. Due to the gas escaping portion, the immersion efficiency is improved and thus the workability is enhanced.

The surface of the optical waveguide layer 7 which is exposed in a pattern is plasma-processed in order to increase the adhesion strength between the optical waveguide layer 7 and the prism coupler 10. The plasma-processing conditions are the same as those for plasma-processing a prism having a trapezoidal cross-section as will be described later. By performing plasma-processing, the surface is cleaned and provided with an atomic-level roughness. Accordingly, the adhesion strength is significantly increased. Thus, delamination of the prism coupler 10 is effectively prevented.

As shown in FIG. 2B, the prism coupler 10 (having the trapezoidal cross-section in the first example) has an optically polished top surface (the functions of the optically polished surface will be described later) and is mounted on the photoresist layer 24 having the above-described patterns 22, 23 and 23a. In the state where the prism coupler 10 is mounted, the adhesive injection portion 22a is located closer to the slope surface of the prism coupler 10 than to the vertical surface thereof. Accordingly, the adhesive injection portion 22a does not have adverse influences such as, for example, extra adhesive remains on the photocoupling section in the vicinity of the vertical surface.

The prism coupler 10 having the trapezoidal cross-section is positionally adjusted with respect to the patterns 22, 23 and 23a of the photoresist layer 24 or with respect to the semiconductor substrate 1 through, for example, a side surface which is suctioned and held by a small-diameter tube or the like (not shown). The plane involved in the adhesion of the prism coupler 10, (i.e., the bottom surface) is plasma-processed before adhesion. The plasma-processing removes the contamination (mainly, wax used in the formation of the prism coupler 10) on the bottom surface is removed, and also an atomic-level roughness is formed in the surface. Thus, the adhesion strength is significantly improved. An example of the plasma-processing conditions is shown below.

<Prism coupler>
(trapezoidal)
Glass material: SK5
Height: about 0.5 mm
Width: about 0.5 mm
<Plasma processing>
$O_2$ 5 Pa; RF power: 200 W; 30 seconds Next, the small-diameter tube (not shown) is removed from the prism coupler 10 mounted on the photoresist layer 24, and the prism coupler 10 is pressed by a metal probe (not shown) to be secured. The prism coupler 10 in this example has a trapezoidal cross-section to be suitably pressed in this manner.

In this state, a photocurable adhesive (not shown) is injected into the substantially T-shaped pattern 22 through the adhesive injection portion 22a using another small-diameter tube. The photocurable adhesive passes through the adhesive passage 22b and is immersed in the substantially T-shaped pattern 22 below the prism coupler 10. After a required amount of photocurable adhesive is injected, the immersion of the photocurable adhesive is observed from above the top surface of the prism coupler 10 which has been optically polished. When sufficient immersion is confirmed, the adhesive is irradiated by light.

In the case where, for example, the photocurable adhesive is UV-curable, the adhesive is irradiated with ultraviolet rays. The irradiation is sufficiently performed in all directions so as to avoid non-uniform irradiation. The top surface of the prism coupler 10 which is optically polished efficiently guides the light to the adhesive.

Then, the substrate is diced along the lattice pattern 23. Subsequently, the photoresist layer 24 is removed by a specific resist remover. As a result, a polarization detection device chip as shown in FIG. 3 is produced. The photoresist layer 24 is removed after dicing in order to prevent the surface of the optical waveguide layer 7 from being contaminated by the dust adhering to the photoresist layer 24 during dicing.

After the adhesive is cured, the prism coupler 10 is supported only by the adhesive layer 13, and the adhesion plane of the prism coupler 10 on the optical waveguide layer 7 is plasma-processed before adhesion. accordingly, delamination of the prism coupler 10 is avoided.

The substantially T-shaped pattern 22 has, for example, the following preferable size. When the adhesion plane of the prism coupler 10 is about 0.5 mm×0.5 mm; the length of the third portion 22c in the second direction is about 0.7 mm, and the length of the T-shaped pattern 22 in the first direction is about 1 mm. The length of the third portion 22c in the first direction is about 0.3 mm. The length of the first portion 22a in the second direction is about 0.3 mm. The length of the second portion 22b in the second direction is about 100 $\mu$m. When the blade used for dicing has a thickness of, for example, 200 $\mu$m, the lattice pattern 22 has a width of about 300 $\mu$m.

In the polarization detection device shown in FIGS. 2A and 2B, the prism coupler 10 which is processed to have a size corresponding to the chip is mounted on the substrate. It is also possible, as shown in FIGS. 4A and 4B, to mount a long prism coupler 35 (FIG. 4B) which is larger than the chip size and then cut the prism coupler 35 to have a size corresponding to the chip size during the dicing step. In this manner, a plurality of prism couplers are positioned simultaneously. Accordingly, the positioning is performed more accurately and more easily.

With reference to FIGS. 4A and 4B, the mounting of the prism coupler 35 will be described, especially the differences between the prism coupler 10 shown in FIGS. 2A and 2B and the prism coupler 35 shown in FIGS. 4A and 4B.

FIG. 4A shows a photoresist layer 34 provided on the optical waveguide layer 7 which overlies the dielectric layer 6, and is formed above the semiconductor substrate 1. The photoresist layer 34 has a substantially T-shaped pattern 32 and a lattice pattern 33 formed therein. The photoresist layer 34 also has a linear pattern 33a which corresponds to the linear pattern 23a in FIG. 2A.

The substantially T-shaped pattern 32 includes a first portion 32a, a second portion 32b (a longitudinal portion), and a third portion 32c (a transverse portion). The third portion 32c has two projecting portions 32d. A length of the third portion 32c in a second direction indicated by arrow N is shorter than a length of a one-chip prism coupler 35' (FIG. 5) obtained as a result of dicing in the second direction N. A length of the substantially T-shaped pattern 32 in a first direction indicated by arrow M is sufficiently longer than the adhesion plane of the prism coupler 35 in the first direction M. A length of the third portion 32c in the first direction is shorter than a length of the prism coupler 35 in the first direction. A length of the second portion 32b in the second direction is shorter than a length of the prism coupler 35' (FIG. 5) in the second direction. The first portion 32a is longer in the second direction than in the first direction. The first portion 32a acts as an adhesive injection portion, and the second portion 32b acts as an adhesive passage.

Since the long prism coupler 35 is larger than the chip size, the projecting portions 32d are provided as gas escaping portions so as not to be covered by the prism coupler 35 mounted on the photoresist layer 34.

The surface of the optical waveguide layer 7 which is exposed in a pattern is plasma-processed in order to increase the adhesion strength between the optical waveguide layer 7 and the prism coupler 35'. The plasma-processing conditions are the same as those described above. By performing plasma-processing, the surface is cleaned and provided with an atomic-level roughness. Accordingly, the adhesion strength is significantly increased. Thus, delamination of the prism coupler 35 is effectively prevented.

As shown in FIG. 4B, the long prism coupler 35 which is larger than the chip size and has a substantially trapezoidal cross-section is mounted on the photoresist layer 34. A top surface of the prism coupler 35 is optically polished. In the state where the prism coupler 35 is mounted, the adhesive injection portion 32*a* is located closer to the slope surface of the prism coupler 35 than to the vertical surface thereof. Accordingly, the adhesive injection portion 32*a* does not have adverse influences such as, for example, extra adhesive remains on the photocoupling section in the vicinity of the vertical surface.

The prism coupler 35 having the trapezoidal cross-section is positionally adjusted with respect to the patterns 32, 33 and 33*a* of the photoresist layer 34 or with respect to the semiconductor substrate 1 through, for example, a side surface which is suctioned and held by a small-diameter tube (not shown).

The plane involved in the adhesion of the prism coupler 35 (i.e., the bottom surface) is plasma-processed before adhesion. The plasma-processing significantly improves the adhesion strength. The plasma-processing conditions are preferably the same as those for the device shown in FIGS. 2A and 2B.

Next, the small-diameter tube (not shown) is removed from the prism coupler 35 mounted on the photoresist layer 34, and the prism coupler 35 is pressed to be secured by a metal probe (not shown). The prism coupler 35 in this example has a trapezoidal cross-section to be suitably pressed in this manner.

In this state, a photocurable adhesive (not shown) is injected into the substantially T-shaped pattern 32 through the adhesive injection portion 32*a* using another small-diameter tube. The photocurable adhesive passes through the adhesive passage 32*b* and is immersed in the substantially T-shaped pattern 32 below the prism coupler 35. After a required amount of photocurable adhesive is injected, the immersion of the photocurable adhesive is observed from above the top surface of the prism coupler 35 which has been optically polished. When sufficient immersion is confirmed, the adhesive is irradiated by light.

In the case where, for example, the photocurable adhesive is UV-curable, the adhesive is irradiated with ultraviolet rays. The irradiation is sufficiently performed in all directions so as to avoid non-uniform irradiation. The top surface of the prism coupler 35 which is optically polished efficiently guides the light to the adhesive.

Figure 5:
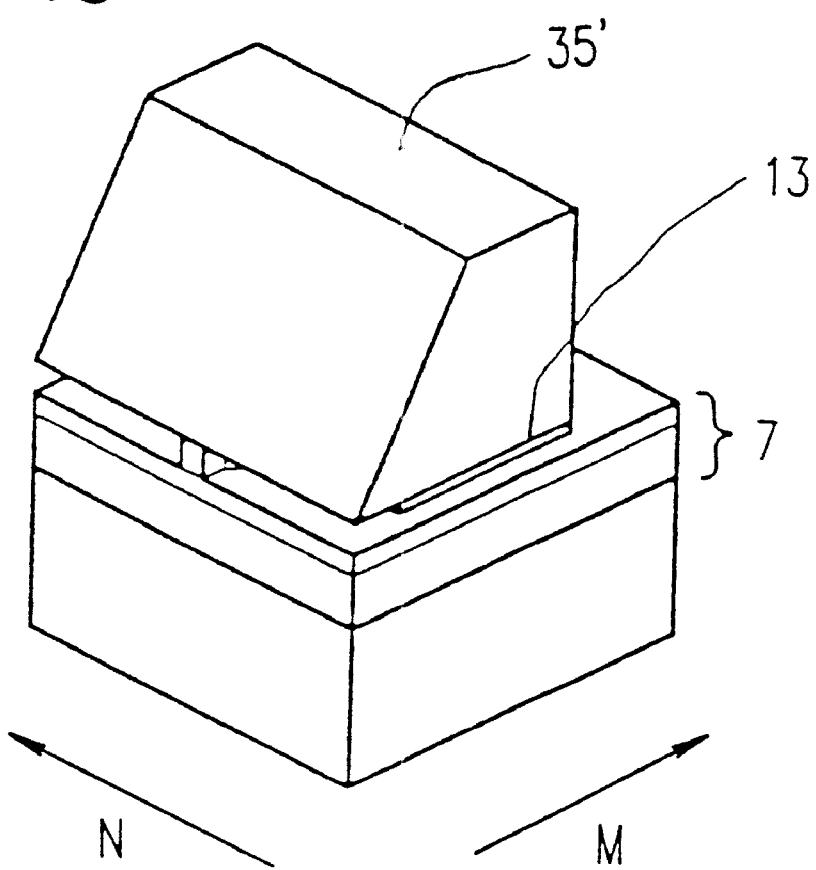
FIG. 5 is an isometric view of the polarization detection device shown in FIGS. 4A and 4B in the form of a one-chip device.

Then, the substrate is diced along the lattice pattern 33. Subsequently, the photoresist layer 34 is removed by a specific resist remover. As a result, a polarization detection device chip 35' as shown in FIG. 5 is produced. The photoresist layer 34 is removed after dicing in order to prevent the surface of the optical waveguide layer 7 from being contaminated by the dust adhering to the photoresist layer 34 during dicing.

Alternatively, a protection layer can be provided on the prism couplers 10 and 35. The protection layer is formed on the prism coupler 10 having a trapezoidal cross-section in, for example, the following manner.

Figure 26:
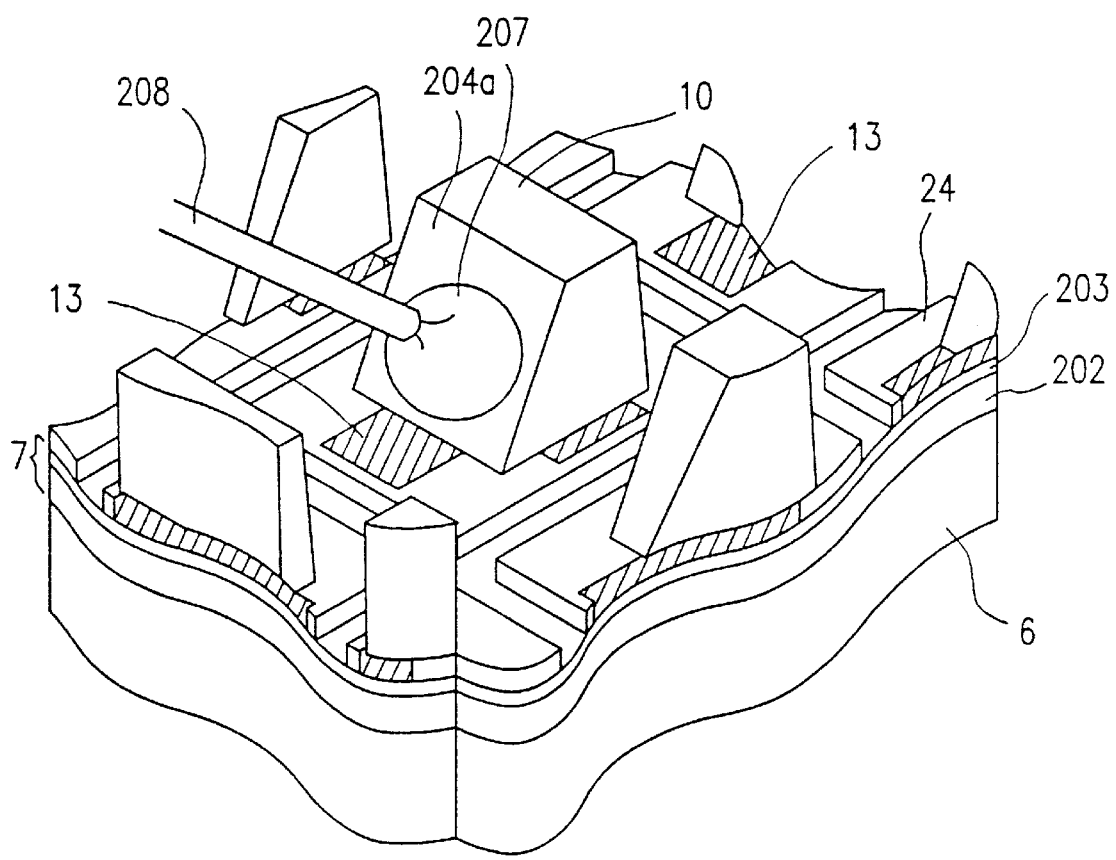
FIG. 26 is an isometric view of the polarization detection device in the first example according to the present invention, illustrating a step of forming a protection layer on the prism coupler.

FIG. 26 shows a protection layer material 207 which is pushed out to the prism coupler 10 from a small-diameter tube 208.

In FIG. 26, the optical waveguide layer 7 includes an upper clad layer 203 and a core layer 202. The prism coupler 10 is secured to the surface of the optical waveguide layer 7, i.e., on the surface of the upper clad layer 203, by adhesion. The photoresist layer 24 is provided for defining the distance between the prism coupler 10 and the upper clad layer 203 so as to improve the immersion efficiency of the adhesive 13, and thus is removed later.

The position of the small-diameter tube 208 is adjusted so as to be located in the vicinity of a light incident plane 204*a* of the prism coupler 10 which is secured by the adhesive 13 through the photoresist layer 24.

A required amount of the protection layer material 207 is exuded from the tip of the small-diameter tube 208. The small-diameter tube 208 is, for example, a cylinder having an inner diameter of about 0.1 mm and an outer diameter of about 0.3 mm. The small-diameter tube 208 is secured to a manipulator (not shown) and is positionally adjustable in the order of several tens of micrometers. The amount of the protection layer material 207 which is exuded is adjustable in units of 0.1 $\mu$m by a microsyringe (not shown) which is connected to the small-diameter tube 208.

Figure 27:
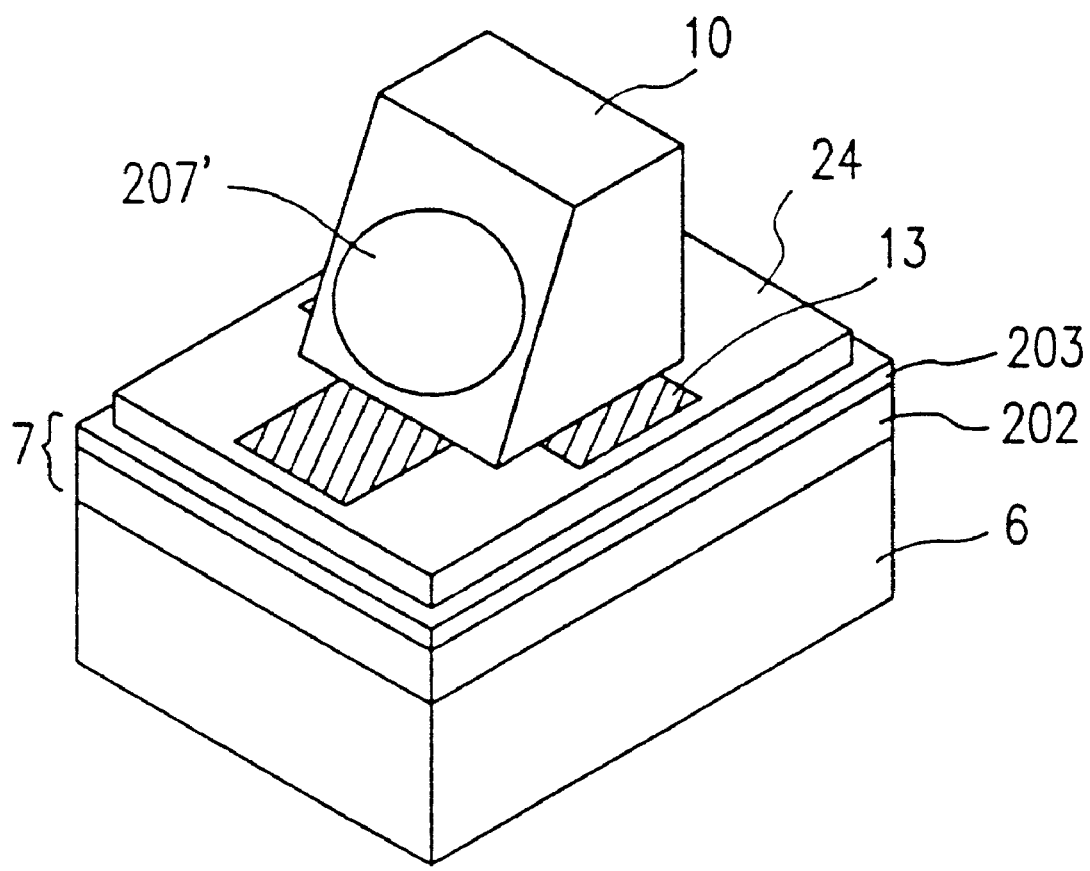
FIG. 27 is an isometric view of the polarization detection device shown in FIG. 26 after the protection layer is formed.
Figure 28:
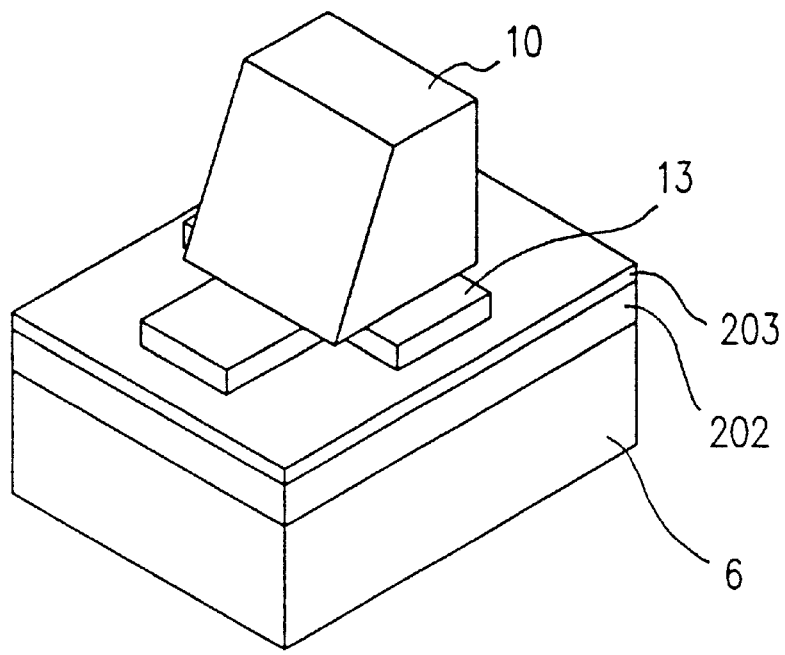
FIG. 28 is an isometric view of the polarization detection device shown in FIG. 26 after a photoresist and the protection layer are removed.

FIG. 27 shows a resulting polarization detection device obtained after dicing. The polarization detection device shown in FIG. 27 is obtained by dicing the substrate shown in FIG. 26 including the dielectric layer 6 and the optical waveguide layer 7 into areas each including the prism coupler 10 after the protection layer material 207' is dried. Since the light incident plane 204*a* of the prism coupler 10 is protected by a protection layer 207', dust generated by dicing does not directly adhere to the light incident plane 204*a*. After the polarization detection device shown in FIG. 27 is obtained by dicing, the photoresist layer 24 and the protection layer 207' are removed. FIG. 28 shows the polarization detection device after the removal of the photoresist layer 24 and the protection layer 207'.

In the case where the protection layer 207' is formed of a photoresist material, the photoresist layer 204 and the protection layer 207' are removed in the same step by a resist remover.

By forming the protection layer 207' which is moisture-resistant on at least one of the light incident plane 204*a* and a light reflecting plane of the prism coupler 10 before dicing and removing the protection layer 207' after dicing as described above, adhesion of the dust to the light incident plane 204*a* of the prism coupler 10 is avoided. Accordingly, the decline in the photocoupling efficiency of the polarization detection device is restricted, and thus the characteristics of the polarization detection device are stabilized.

In the case where the protection layer 207' is formed of a liquid material containing an organic solvent, a polymer coat is formed by drying of the protection layer 207'. Such a liquid material facilitates the formation and removal of the protection layer 207', which improves the workability. Especially by forming the protection layer 207' of a photoresist material, the protection layer 207' is removed by a resist remover which is compatible with a photographic process. Therefore, the workability is improved.

Since the prism coupler 10 is secured to the upper clad layer 203, positioning of the small-diameter tube 208 is facilitated. Since the protection layer 207' is formed on the prism coupler 10 after the prism coupler 10 is secured to the upper clad layer 203, the protection layer material 207 does not come into the adhesion plane of the prism coupler 10 which is to adhere to the upper clad layer 203. Therefore, defective adhesion does not occur between the prism coupler 10 and the upper clad layer 203.

Figure 29:
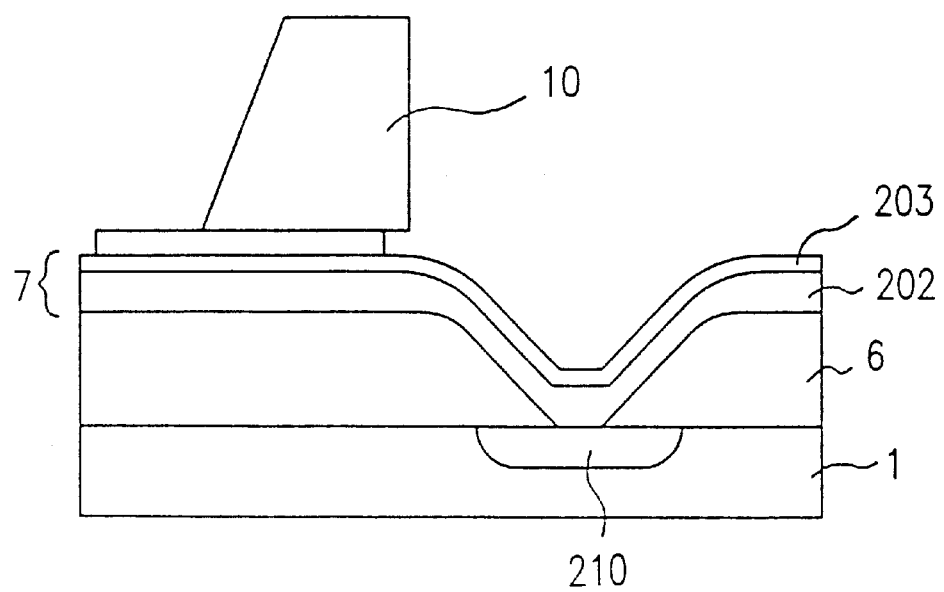
FIG. 29 is a cross-sectional view of the polarization detection device shown in FIG. 28.

FIG. 29 shows a schematic structure of a cross-section of the polarization detection device shown in FIG. 28. Hereinafter, propagation of the waveguide light will be briefly described with reference to FIG. 29.

A photodiode 210 is formed in the semiconductor substrate 1. The dielectric layer 6 is provided on the semiconductor substrate 1. The dielectric layer 6 is processed to taper in the vicinity of the photodiode 210. The waveguide light which is excited by the prism coupler 10 propagates through the optical waveguide layer 7 toward the right in FIG. 29. When the waveguide light enters the tapered portion, the waveguide light starts to leak toward the semiconductor substrate 1 and is coupled to the photodiode 210 at a high efficiency.

Figure 30A:
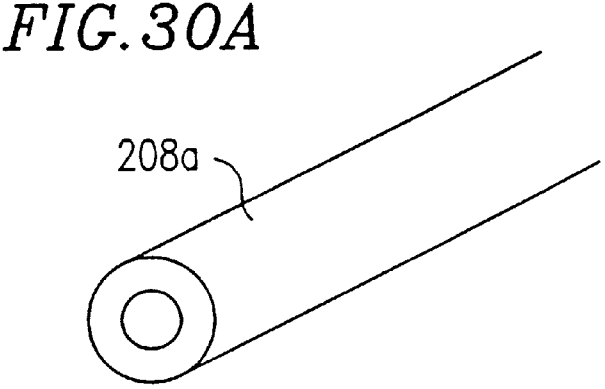
FIGS. 30A through 30C are isometric views of different small-diameter tubes used for applying a protection layer material to the prism coupler.
Figure 30B:
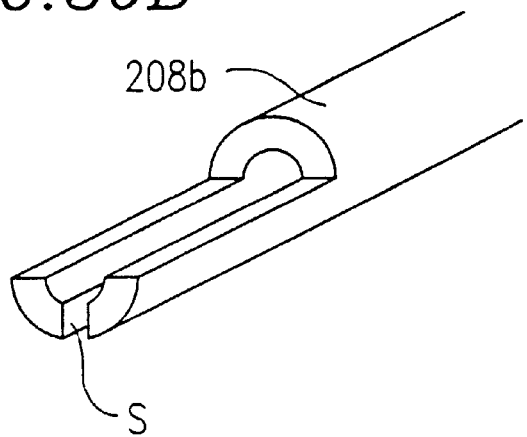
Figure 30C:
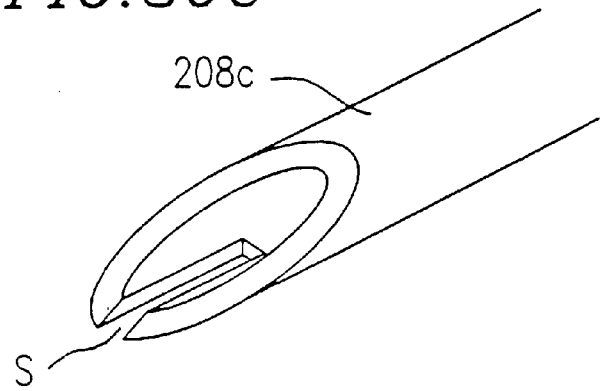

With reference to FIGS. 30A, 30B and 30C, shapes of a small-diameter tube used for coating the prism coupler 10 with the protection layer material 207 will be described.

FIG. 30A shows a small-diameter tube 208a having an end surface which is substantially perpendicular to the center line in the axial direction of the tube. Since the end surface is substantially perpendicular to the center line, the end surface is easy to repair even when broken.

FIG. 30B shows a small-diameter tube 208b. An end portion of the tube is partially cut out, and the remaining end portion is divided by a slit S. The protection layer material 207 filling the small-diameter tube 208b is provided to the slit S by a capillary action. Since the end portion of the small-diameter tube 208b is thinned due to the cut-out, the protection layer material 207 is applied to the prism coupler 10 with satisfactory precision even when the prism coupler 10 is microscopic.

Since the end portion of the small-diameter 208b is about half of the end portion of the small-diameter 208a, the work precision is about twice as high. In other words, the protection layer material 207 is applied to microscopic areas by the small-diameter tube 208b.

The protection layer material 207 supplied to the slit S by the capillary action is applied to the light incident plane of the prism coupler 10 (or 35) from the slit S by surface tension. Accordingly, a microscopic amount of the protection layer material 207 which is less than the minimum possible extrusion amount of the microsyringe can be applied. For this reason, the protection layer material 207 can be applied to the light incident plane having a size of about 0.5 mm×0.5 mm by the small-diameter tube 208b.

FIG. 30C shows a small-diameter tube 208c. An end portion of the tube is obliquely cut, and the tip portion thereof is divided by a slit S. As in the case of the small-diameter tube 208b, the protection layer material 207 filling the small-diameter tube 208c is provided to the slit S by a capillary action. Since the tip portion of the small-diameter tube 208c is thinner than the end portion of the small-diameter tube 208b, the protection layer material 207 can be applied to a still smaller area.

The small-diameter tubes 208a, 208b and 208c having the above-described end and tip portions can be obtained by, for example, a dicing apparatus. A small-diameter metal tube is secured to a table with wax which is removable with a solvent, and is processed by a diamond blade. The wax is then removed, and the metal tube is washed. The small-diameter tubes 208a, 208b and 208c are easily processed at the ends thereof since they are formed of metal. A commercially available small-diameter metal tube having an end obliquely cut is usable.

Figure 6:
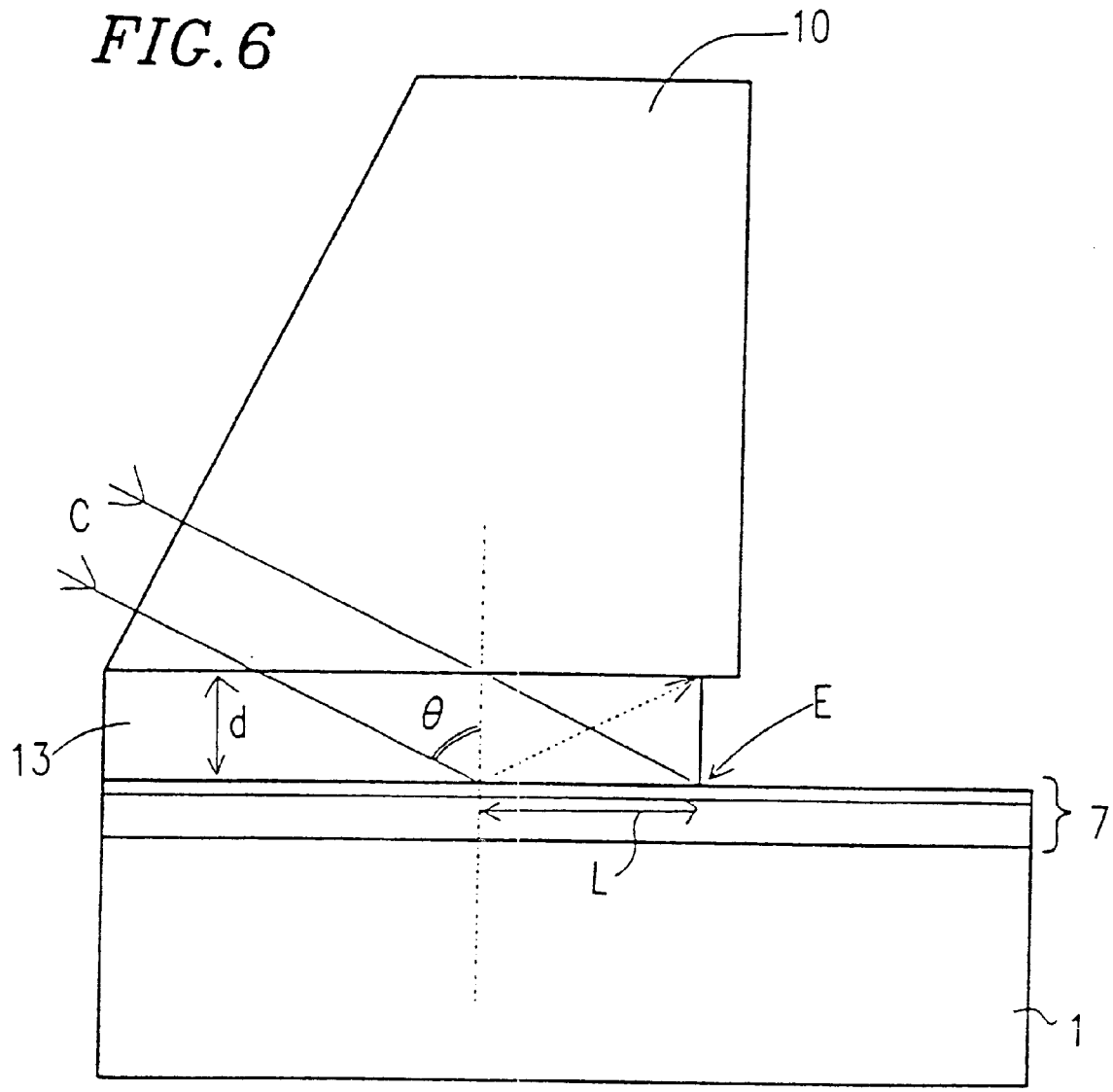
FIG. 6 is a side view of the polarization detection device in the first example.

The polarization detection device in the first example also has an advantageous feature relating the adhesive layer 13. With reference to FIG. 6, the adhesive layer 13 will be described in detail. It should be noted that the polarization splitter, the photodetecting section, and the integrated circuit are omitted, and the adhesive layer 13 is shown as having a greater thickness than in FIG. 1 for clarity.

Referring to FIG. 6, the adhesive layer 13 between the optical waveguide layer 7 and the prism coupler 10 having the trapezoidal cross-section has a straight edge surface E formed by the photoresist layer (which has been already removed) having a prescribed pattern. Since the refractive index of the glass material of the prism coupler 10 and the refractive index of the adhesive layer 13 are substantially equal to each other, incident light C is coupled to the optical waveguide layer 7 in the vicinity of the edge surface E of the adhesive layer 13, not at a right-angled corner of the prism coupler 10. Accordingly, the prism coupler 10 does not need to have a precisely right-angled corner, and the corner can be rounded or partially cut out. Accordingly, a low-cost prism coupler which is not produced with a high precision can be used.

The incident light C is partially reflected by the interface between the optical waveguide layer 7 and the adhesive layer 13. It is desirable that the incident light C is not further reflected by the bottom surface of the prism coupler 10, i.e., to prevent optical loss caused by the multiple reflections.

In order to realize a reduction in further reflections, the thickness d of the adhesive layer 13 needs to be set to L/tan θ or more, where L is the longer diameter of the incident light spot on the interface between the optical waveguide layer 7 and θ is the adhesive layer 13, and the angle of incidence with respect to the optical waveguide layer 7.

More specifically, the adhesive layer 13 should not function as a thin film in order to prevent multiple reflections. This is realized by defining the thickness d of the adhesive layer 13 so as to suppress the multiple reflections. As described above, the thickness d of the adhesive layer 13 needs to fulfill expression (1).

$$d \geq L/\tan \theta \qquad (1)$$

Accordingly, when the diameter of the incident light spot is 10 µm, and the angle of incidence is θ=60°, L=20 µm. Thus, the thickness d of the adhesive layer 13 needs to be at least 11.5 µm.

In this example, the thickness d of the adhesive layer 13 is about 40 µm in order to facilitate the removal of the photoresist layer below the prism coupler 10.

An exemplary structure of the polarization detection device in the first example is as follows.

Dielectric layer:
  CVD SiO$_2$ about 4 µm thick
Optical waveguide layer:
  #7059 glass (Corning, Inc.)
  RF sputtering layer about 0.6 µm thick
  SiO$_2$ RF sputtering layer about 0.1 µm thick
Photoresist layer:
  PMER-AR900
  (Double coating; Tokyo Ohka Kogyo Co., Ltd.);
  about 40 µm In the above description, the prism coupler 10 having a general trapezoidal cross-section is used. The photocoupler can be a prism 10a having a parallelogram cross-section as shown in FIG. 7A, a prism 10b having an inverted trapezoidal cross-section as shown in FIG. 7B, or a beam splitter 10c having a rectangular cross-section as shown in FIG. 7C. In FIGS. 7A, 7B and 7C, letter C represents incident light.

The prism 10a having a parallelogram cross-section shown in FIG. 7A can be produced by cutting a flat plate in parallel. Thus, the prism 10a is easier to produce and thus is less costly than the prism coupler 10 (FIG. 6).

The prism 10b having an inverted trapezoidal cross-section shown in FIG. 7B reflects and guides the incident light to the edge surface of the adhesive layer 13. The light is incident vertically to the semiconductor substrate 1, and thus the size of the overall structure is reduced.

The beam splitter 10c having a rectangular cross-section shown in FIG. 7C includes a mirror 10d therein. The mirror 10d is formed of a metal material or a plurality of dielectric layers. Accordingly, the decline in the coupling efficiency caused by contamination of the light reflecting plane is suppressed more than when the prism 10b is used.

The polarization detection device in the first example also has an advantageous feature relating to a method for producing the tapered portion 9 shown in FIG. 1. Referring to FIG. 1, the mode light obtained by the polarization splitter 15 is guided to the photodetecting section through the tapered portion 9. The tapered portion 9 is produced by processing a part of the dielectric layer 6 to be tapering and forming the optical waveguide layer 7 on the tapered portion of the dielectric layer 6 and the anti-reflection layer 12 which is externally exposed due to the absence of the dielectric layer 6. Specifically, the tapered portion is formed by wet etching and then a top surface thereof is polished.

A method for producing such a tapered portion is described in Japanese Laid-Open Publication No. 4-55802. With reference to FIGS. 8A through 8G, the method will be described.

On a Si substrate 41 (FIG. 8A), a thermal $SiO_2$ film 42 is formed (FIG. 8B). Then, a second $SiO_2$ film 43 which is adjusted in terms of etching rate is formed on the thermal $SiO_2$ film 42. Then, a photoresist 44 is formed on the second $SiO_2$ film (FIG. 8D) and patterned (FIG. 8E).

On the Si substrate 41, the photoelectric converter 3 shown in FIG. 9 in a simple manner is formed but is omitted in FIGS. 8A through 8G.

The $SiO_2$ film 42 acts as a buffer layer for the optical waveguide layer and corresponds to the dielectric (or buffer) layer 6 in FIG. 1. The $SiO_2$ film 42 and the second $SiO_2$ film 43 are etched by an appropriate etchant. The second $SiO_2$ film 43, which has a higher etching rate than that of the $SiO_2$ film 42, is etched faster than the $SiO_2$ film 42.

The $SiO_2$ film 42, which has a relatively lower etching rate, is etched gradually in proportion to the time period during which the $SiO_2$ film 42 is in contact with the etchant.

In consequence, as shown in FIG. 8F, an area of the $SiO_2$ film 42 which is not covered with the photoresist 44 is significantly etched, and an area of the $SiO_2$ film 42 which is covered by the photoresist 44 is slightly etched. As a result, a tapered portion 45 of the $SiO_2$ film 42 is obtained as shown in FIGS. 8F and 8G.

Figure 9A:
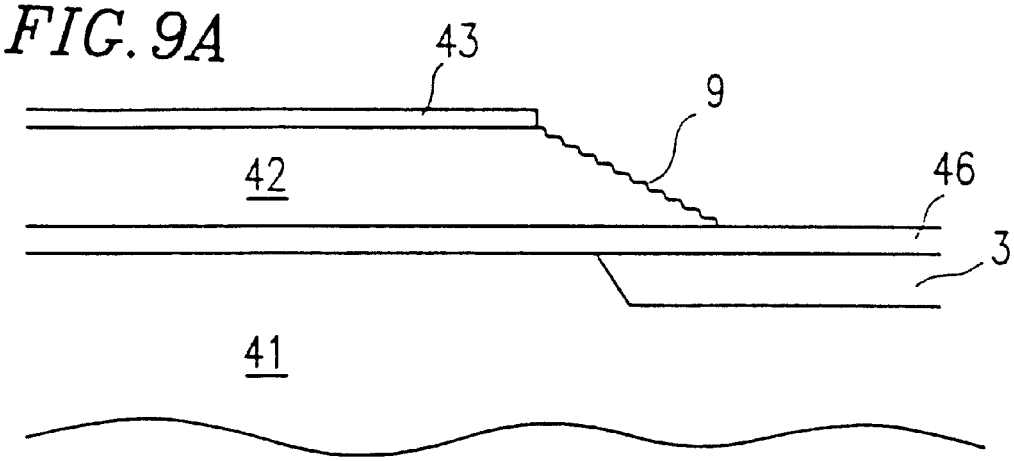
FIGS. 9A through 9C are cross-sectional views illustrating a process for polishing the tapering portion in the polarization detection device in the first example.
Figure 9B:
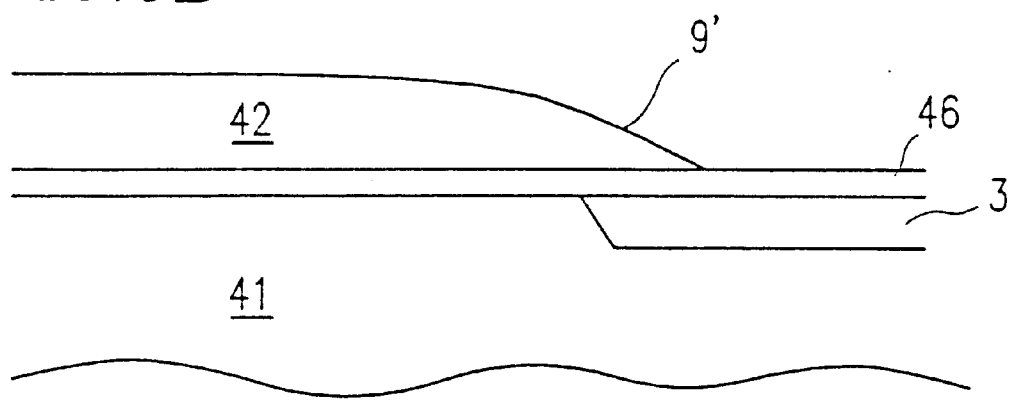
Figure 9C:
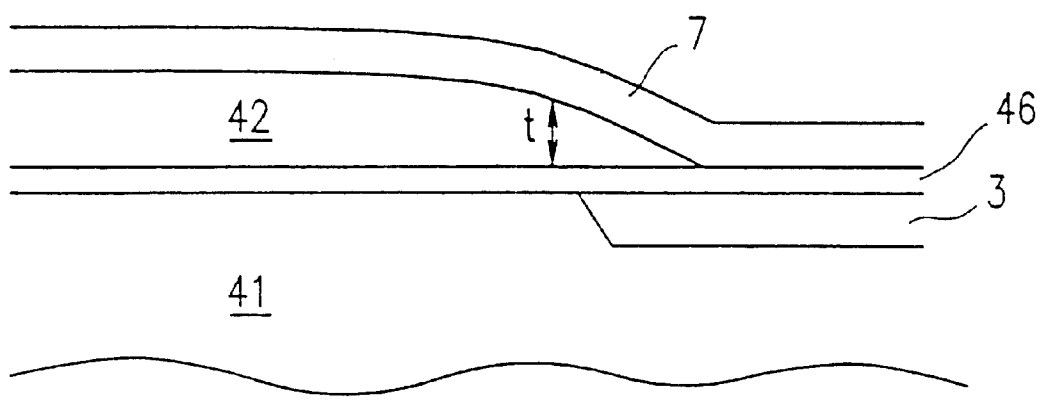

The tapered portion 45 is polished as illustrated in FIGS. 9A, 9B and 9C. In FIGS. 9A, 9B and 9C, the tapered portion is represented by reference numeral 9.

The tapering section 9 etched in the above-described manner has a higher surface roughness than immediately after being formed. As shown in FIG. 9A, the tapered portion 9 is polished while the second $SiO_2$ film 43 is left. As a polishing material, a diamond slurry having a diameter of 0.5 $\mu$m is used, for example. A suitable polishing cloth is soft. Reference numeral 46 in FIGS. 9A, 9B and 9C represents a silicon nitride layer, which acts as a protection layer, during the etching step for obtaining the tapered portion and the polishing step, for protecting the Si substrate 41 against being damaged by etching and polishing.

The second $SiO_2$ film 43 is removed by polishing as shown in FIG. 9B. The tapered portion 9 in FIG. 9A becomes a smooth and slowly-curved tapering section 9'.

Then, as shown in FIG. 9C, an optical waveguide layer 7 is formed on the $SiO_2$ film 42 so as to cover the protection layer 46.

One feature of the polishing process in this example is that the surface of the $SiO_2$ film (dielectric or buffer layer) 42 which is roughened by etching is smoothed. This widens the selection of materials usable for the dielectric (or buffer) layer 42 so as to include NSG, PSG and BPSG, and also reduces the propagation loss in the optical waveguide layer 7 having the tapered portion 9'.

The surface of the tapered portion 9' is not straight but is slowly curved with no bending edge. The length of the tapered portion 9' is about 100 $\mu$m. In order to achieve highly efficient coupling of the propagation light, the maximum sloping angle of the tapered portion 9' needs to be about 10 degrees. The tapered portion 9' in this example sufficiently fulfills the condition.

Returning to FIG. 1, in the case where the projecting elements such as, for example, the upper layer wire 17 and the electrode pad 18 are exposed during the polishing, such elements can be covered by forming another dielectric layer thereon. The wires, which are formed of a metal material, possibly adhere to the surface of the dielectric layer 6 if exposed during polishing and thus increase the propagation loss. When an element harder than the dielectric layer 6 is exposed outside, the surface of the dielectric layer 6 is damaged during polishing and this also increases the propagation loss.

Needless to say, the tip of the tapered portion 9 is within the light receiving region 8 of the photoelectric converter 3. However, the propagation light leaks toward the semiconductor substrate 1 before reaching the area where the thickness of the dielectric layer 6 is completely zero. The leakage starts to occur in the vicinity of the area of the dielectric layer 6 where the dielectric layer 6 does not act as a buffer layer anymore. Under these circumstances, it is desirable that the tip of the tapered portion 9 be positionally aligned with the photoelectric converter 3 with sufficient room. In other words, the dielectric layer 6 needs to have a sufficient thickness t (FIG. 9C) to function as a buffer layer at least at the end of the photoelectric converter 3 on the light incident side.

In the first example, the optical waveguide layer 7 is separated from the semiconductor substrate 1 including the photoelectric converter 3 by two nitride layers. Therefore, the distance through which the light propagates in the two nitride layers needs to be considered. Such a distance is the so-called coupling distance to the photodetecting section and needs to be, for example, at least 20 $\mu$m. In this example, the coupling distance W in FIG. 1 is set to be 70 $\mu$m in consideration of the processing precision of the tapered portion 9 (resolution of the photoresist layer, change in the pattern size due to etching and polishing, etc.).

EXAMPLE 2

FIGS. 10 through 13 show a polarization detection device in a second example according to the present invention. The polarization detection device in the second example has an advantageous feature relating to a structure of the polarization splitter.

Figure 10:
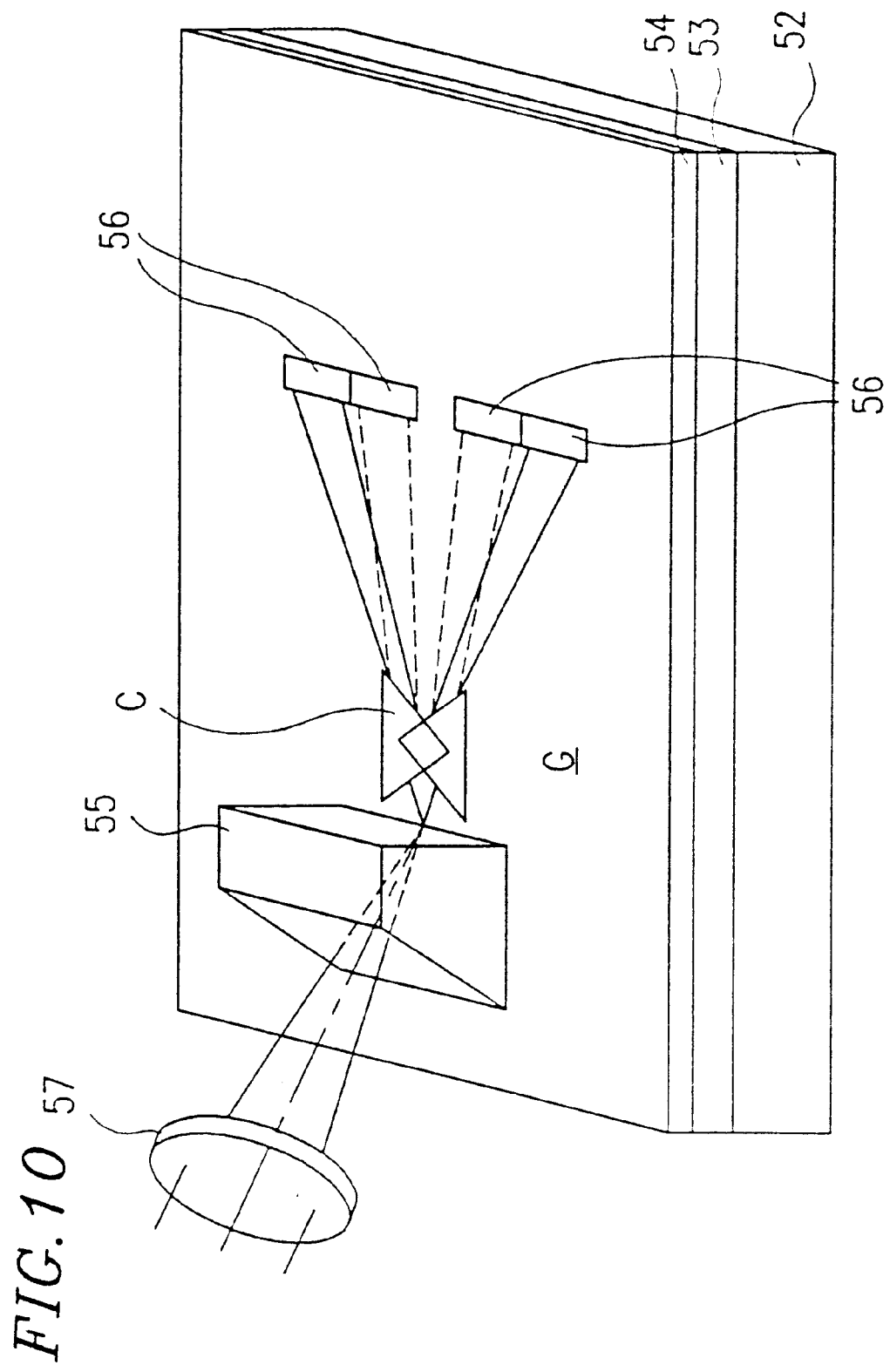
FIG. 10 is an isometric view of a polarization detection device in a second example according to the present invention.

With reference to FIG. 10, the polarization detection device in the second example will be described.

On a semiconductor substrate 52, a dielectric layer (buffer layer) 53 is provided. An optical waveguide layer 54 is provided on the dielectric layer (buffer layer) 53. On the optical waveguide layer 54, a prism coupler 55 is secured, and photodetecting sections 56 are provided in the semiconductor substrate 52. A light converging lens 57 is provided above the prism coupler 55, obliquely and to the left in FIG. 10. The light converging lens 57 guides converged light to the prism coupler 55.

Figure 11:
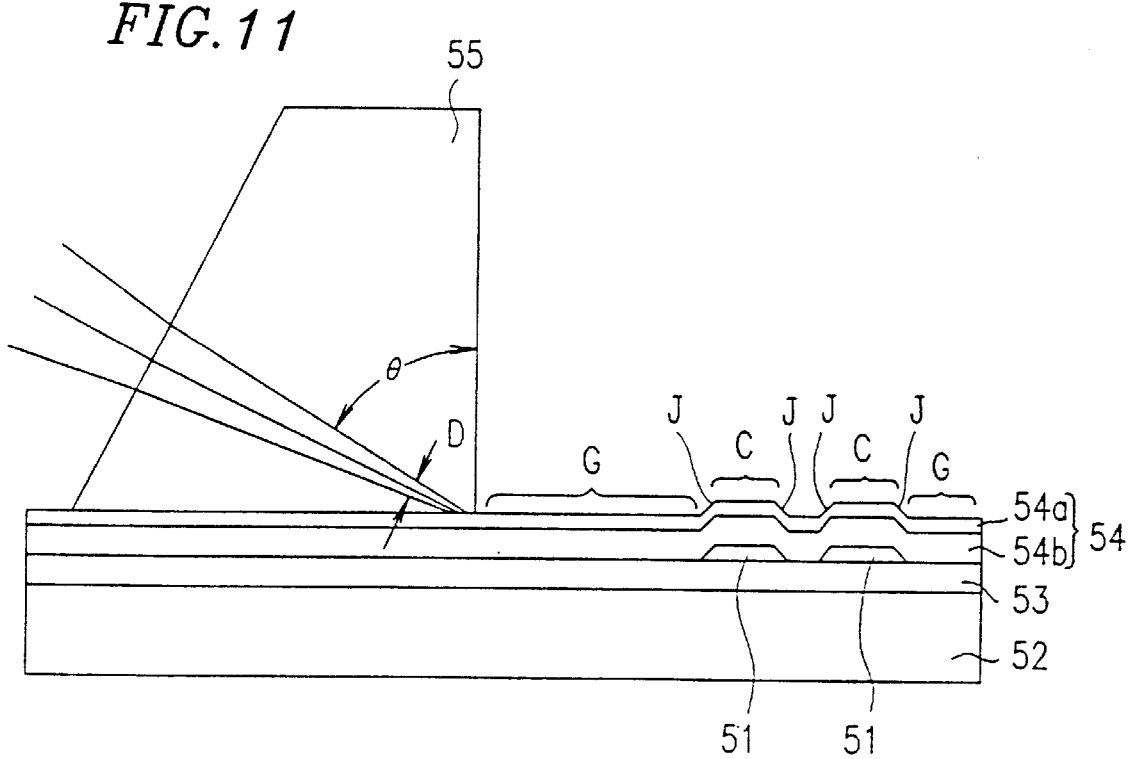
FIG. 11 is a cross-sectional view of the polarization detection device shown in FIG. 10.

FIG. 11 shows a cross-sectional view of the polarization detection device shown in FIG. 10. The optical waveguide layer 54 includes areas G and C extending from left to right in FIG. 11 and having different effective indices. The areas G and C are coupled to each other by tapered portions J which are tapering sufficiently slowly with respect to the wavelength of the light. The area G includes a first waveguide, and the area C includes a second waveguide.

The area C includes two triangular, bottom surfaces of which are partially overlapped to each other in the light propagation direction. The two triangles are provided so as to be opposed to each other between the prism coupler 55 and the photodetecting sections 56. The area G is provided on the dielectric layer 53 on the semiconductor substrate 52 and includes a non-alkaline glass layer 54b (formed of, for example, #7059 non-alkaline glass, Corning, Inc. ) and a $SiO_2$ layer 54a which are laminated.

The area C includes a $Ta_2O_5$ layer 51, the non-alkaline glass layer 54b, and $SiO_2$ layer 54a which are sequentially laminated.

The $Ta_2O_5$ layer 51, the $SiO_2$ layer 54a, and the non-alkaline glass layer 54b can be formed by, for example, sputtering, CVD, or vapor deposition. The tapered portions J can be formed using a shadow mask method during the formation of the $Ta_2O_5$ layer 51.

The dielectric layer 53 can be formed of a CVD film such as, for example, NSG, PSG, or BPSG film described in the first example.

The optical waveguide layer 5 4 can be formed of a material other than the above-mentioned, but the above-mentioned dielectric materials are preferable because they are difficult to crystallize and thus provide an optical waveguide having a low propagation loss. Exemplary refractive indices and thicknesses of each of the dielectric materials are as follows.

PSG:
  refractive index: 1.44; thickness: about 4 μm $Ta_2O_5$:
  refractive index: 2.04; thickness: about 0.078 μm Non-alkaline glass:
  refractive index: 1.53; thickness: about 0.57 μm $SiO_2$:
  refractive index: 1.43; thickness: about 0.1 μm With respect to the light having a wavelength of 780 nm, polarization of both of the TEo mode light and the TMo mode light becomes the single transverse mode in the areas G and C. The effective indices of the TEo mode light and the TMo mode light in the areas G and C are as follows.

|  | Area G | Area C |
| --- | --- | --- |
| TEo | 1.4798 | 1.5876 |
| TMo | 1.4729 | 1.5247 |

In order to avoid total reflection of the propagation light by any border, the angle of incidence α to the border of the propagation light needs to fulfill

|α|<$sin^{-1}$(Area G (TEo)/Area C (TEo))

|α|<$sin^{-1}$(1.4798/1.5876)=68.8°

Figure 12:
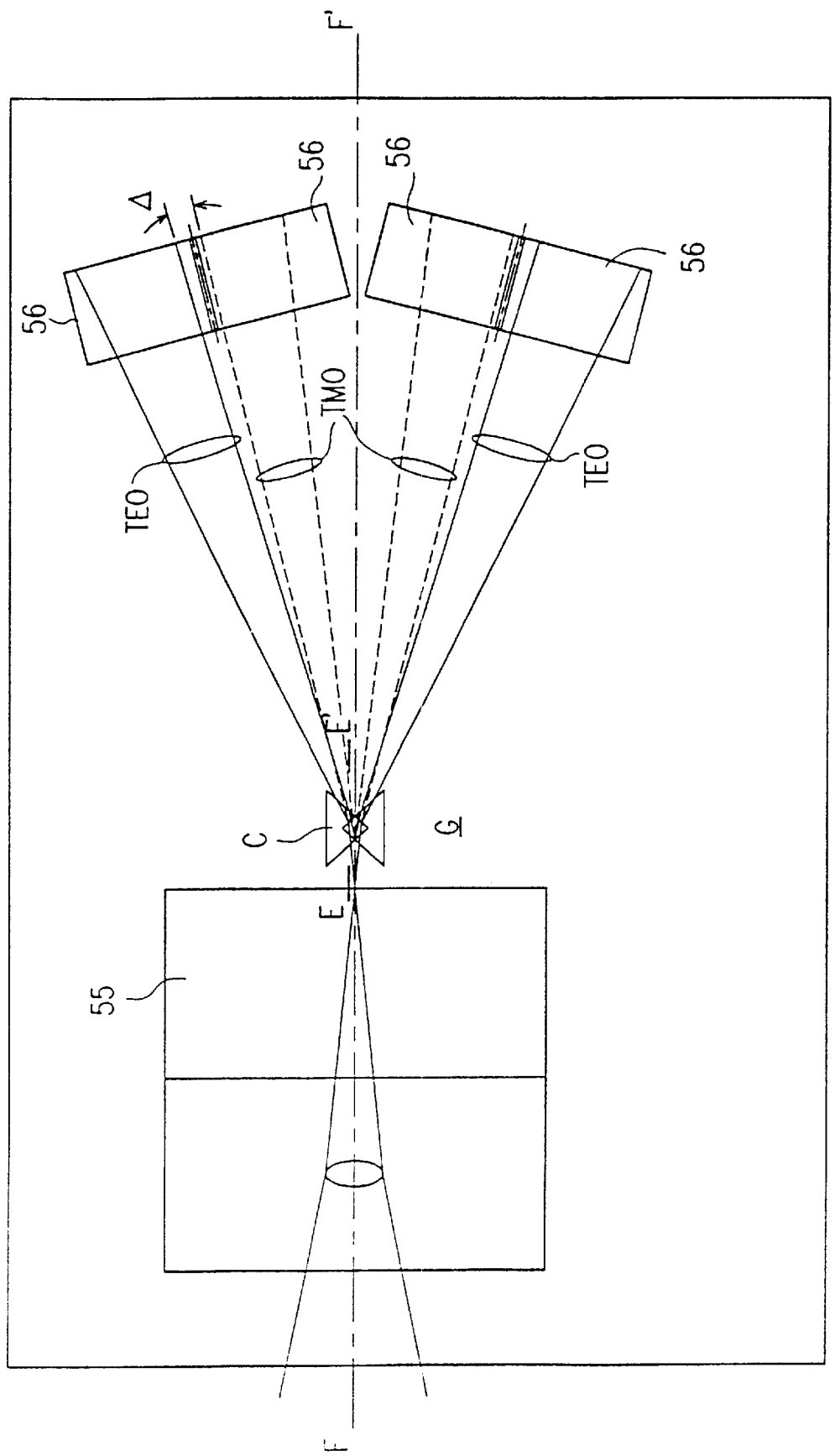
FIG. 12 is a plan view of the polarization detection device shown in FIG. 10.

In the second example, this is fulfilled by causing the border to have an angle of 45° with respect to the center line F–F' (FIG. 12).

More specifically, from the effective refractive indices described above, in the case where the angle made of the border and the center line F–F' is appropriately set, the angle at which the light is incident on the final border (final border in the propagation direction) is calculated by repetitively applying Snell's Law. Accordingly, the range for the angle made of the border and the center line F–F' by which the angle of incidence α does not exceed 68.8° is easily obtained.

The polarization detection device in the second example is structured so that each of the TEo mode light and the TMo mode light to be obtained as a result of splitting, after being converted into converged light by the light converging lens 57, has a focal point thereof positioned on the edge surface of the prism coupler 55 (straight edge surface E of the adhesive layer 13 in FIG. 6).

Figure 13:
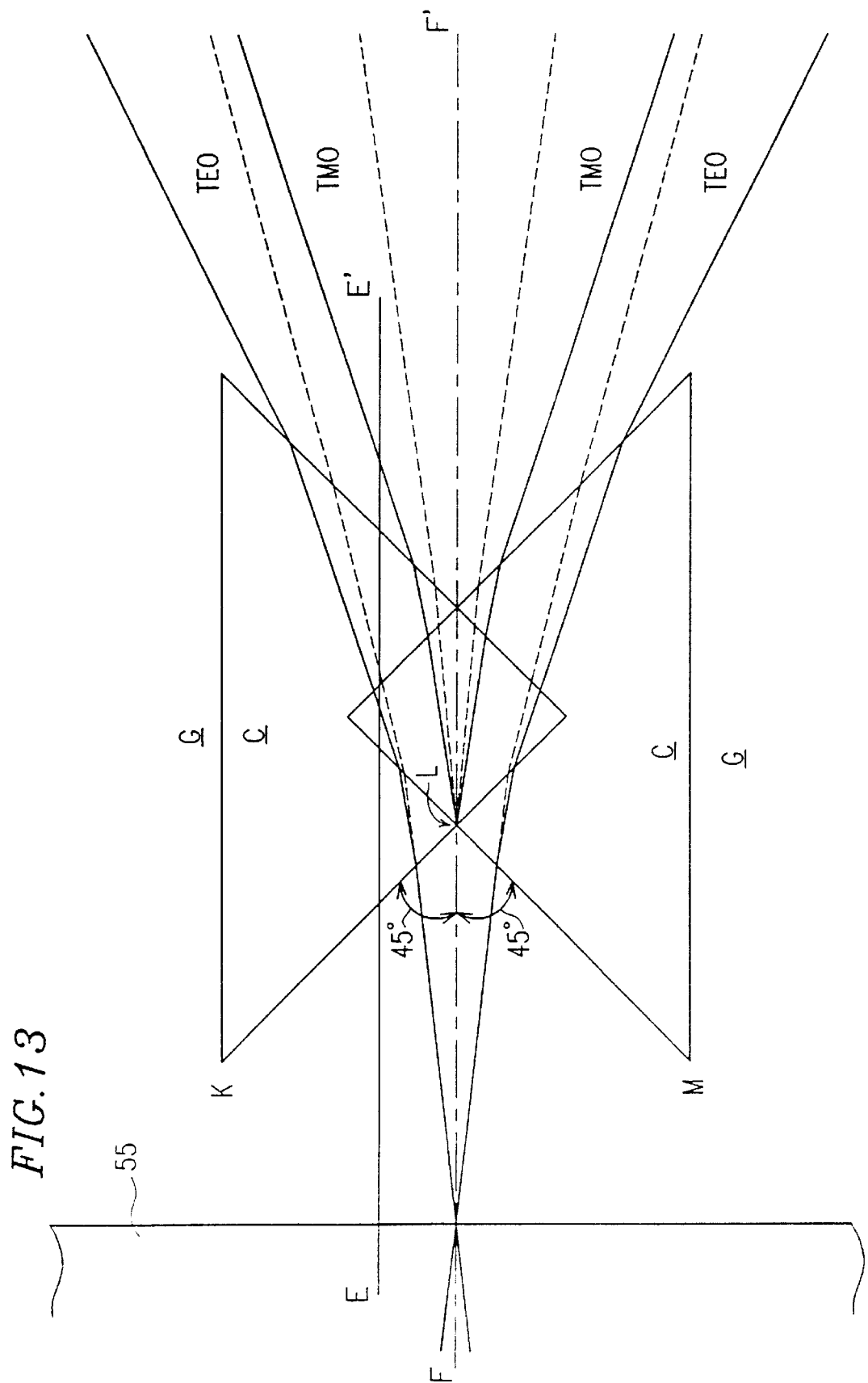
FIG. 13 is a partial enlarged plan view of the polarization detection device shown in FIG. 10.

FIG. 12 is a plan view of the vicinity of the polarization splitter, and FIG. 13 is an enlarged view of a polarization splitting pattern. As described above, the border is caused to have an angle of 45° with respect to the center line F–F' in order to fulfill the above-described condition for avoiding total reflection of the propagation light by any border.

In FIG. 13, the border KLM has a line-symmetrical shape with respect to the optical axis in terms of the angles made with the center line F–F'. Accordingly, the light guided to the optical waveguide 54 via the light converging lens 57 and the prism coupler 55 is propagated as diverging light in the area G. However, the diverging light is split in two after passing through the area G and refracted in such directions of being distanced from each other. The light split into two is further refracted three times at the borders between the areas G and C, and then substantially polarized at an angle of Δ (FIG. 12) before being detected by the photodetecting sections 56.

The polarization detection device in the second example splits propagation light diverging at a small angle into two light beams. Thus, even light diverging at a larger angle is easily split into light of two modes. Since the two modes obtained as a result of splitting are refracted in such directions of being distanced from each other, spatial crossing of polarization of different modes does not occur. Accordingly, splitting and detection of the polarization are performed accurately.

EXAMPLE 3

Figure 14:
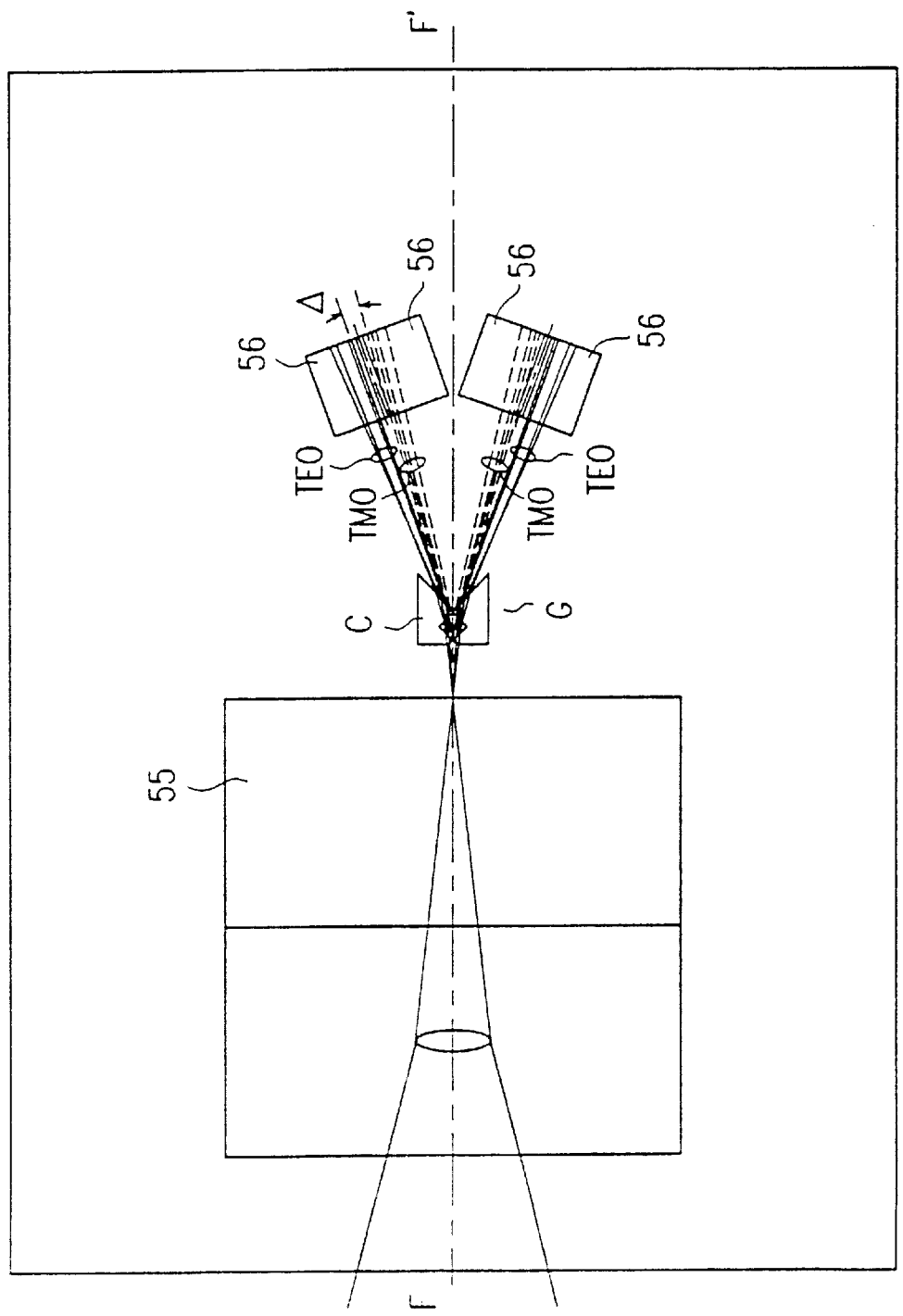
FIG. 14 is a plan view of a polarization detection device in a third example according to the present invention.
Figure 15:
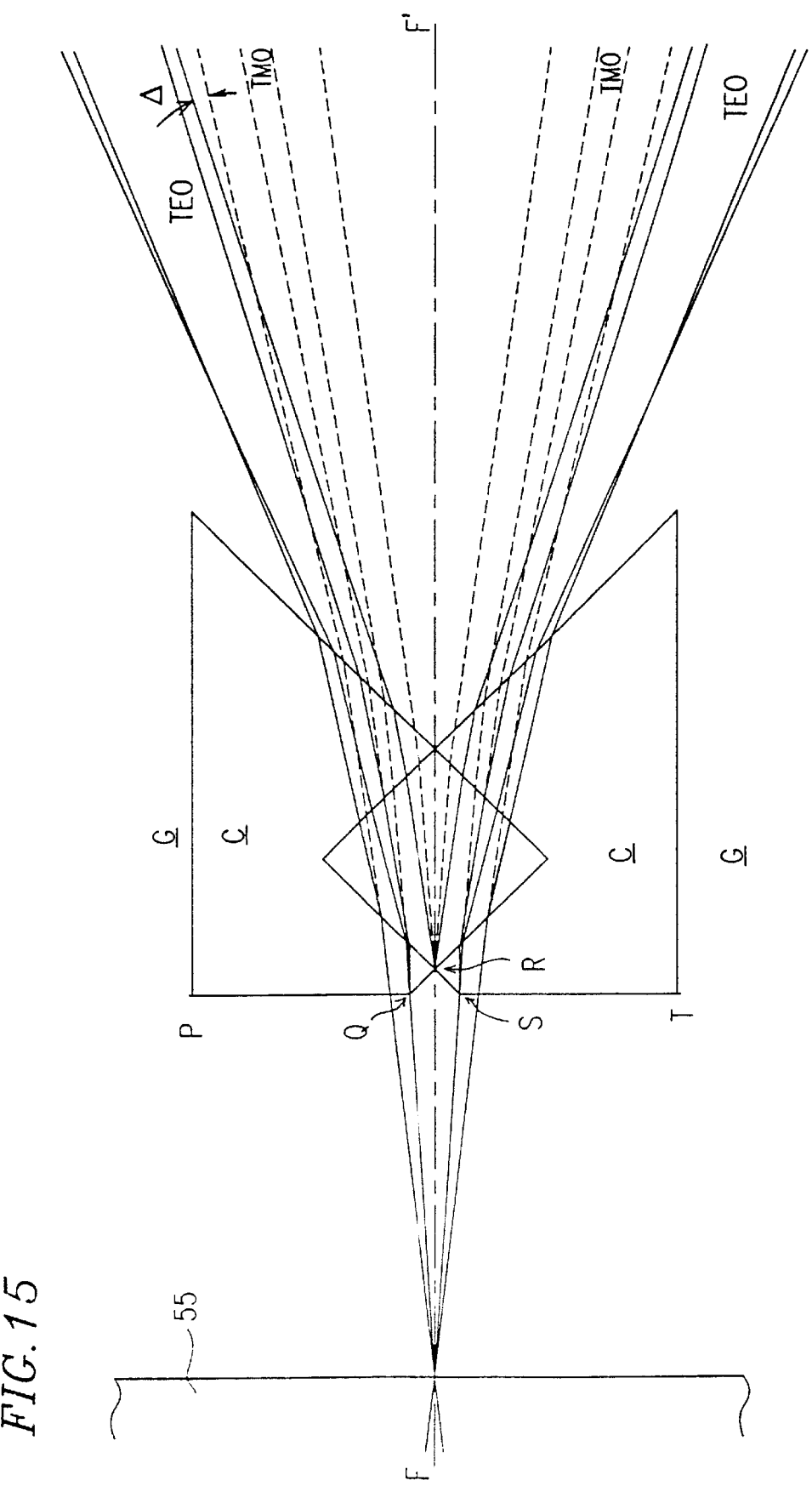
FIG. 15 is an partial enlarged plan view of the polarization detection device shown in FIG. 14.

FIGS. 14 and 15 show a polarization detection device in a third example according to the present invention. The polarization detection in the third example has a feature in a structure of the polarization splitter.

As shown in FIGS. 14 and 15, the polarization splitter in the third example has borders having such a shape as to split each of the TEo mode light and the TMo mode light into four light beams. The identical reference numerals as those in the second example will be used.

As shown in FIG. 15, the polarization splitter has a shape obtained by cutting a left part of the area C shown in FIG. 13 so that the area C has a line perpendicular to the optical axis. A triangular cutout is formed with the optical axis as the center, the pattern being symmetrical with respect to the optical axis. The border PQRST is provided along this part of the pattern.

Whereas the borders QR and RS have an angle of 45° with respect to the center line F–F', borders PQ and ST are perpendicular with respect to the center line F–F'. Therefore, the refractive angles of the light by the borders PQ and ST are smaller than the refractive angles by the borders QR and RS. The positions of points Q and S are preferably set so as to split the diverging light into four light beams almost equally.

In this case, the substantial mode splitting angle Δ is determined by the refractive angles and the diverging angles of the TEo mode light passing through the border QR (or the border RS) and the TMo mode light passing through the border PQ (or the border ST). The diverging light is split into four light beams in this example, each of which has a still smaller diverging angle compared to in the second example shown in FIG. 13. Accordingly, the splitting of light into modes is easy, and the optical path length until the mode splitting is completed is shortened in consideration diameter of the light beam. In other words, an identical optical length provides a larger splitting angle. This is advantageous for producing a polarization detection device having more stable reliability.

The third example has an advantageous feature in that light obtained by splitting the light passing through the border QR (or the border RS) and refracted four times runs in substantially the same direction as light obtained by splitting the light passing externally with respect to the optical axis, namely, passing through the border PQ (or the border ST). Accordingly, the modes obtained by splitting the light are guided to the photodetecting sections 56.

In the second and third examples, the tapered portion J (FIG. 11) needs to be formed along all the borders where the propagation light passes. Due to such a structure, the propagation loss is reduced and thus the coupling efficiency is improved. Specifically, the tapered portion J is provided around all the polarization splitting patterns shown in FIGS. 11 and 15. The tapered portion J is not necessary in an area where the propagation light does not pass or an area extending parallel to the light.

According to the above-described structure, the tapered portion has a tip which is omni-directed in the plane where the tapered portion is formed. A tapered portion having such a structure can be produced by, for example, a method shown in FIG. 16 described in Journal of Lightwave Technology (vol. 8, no. 4, pp. 587–593, April 1990).

Figure 16:
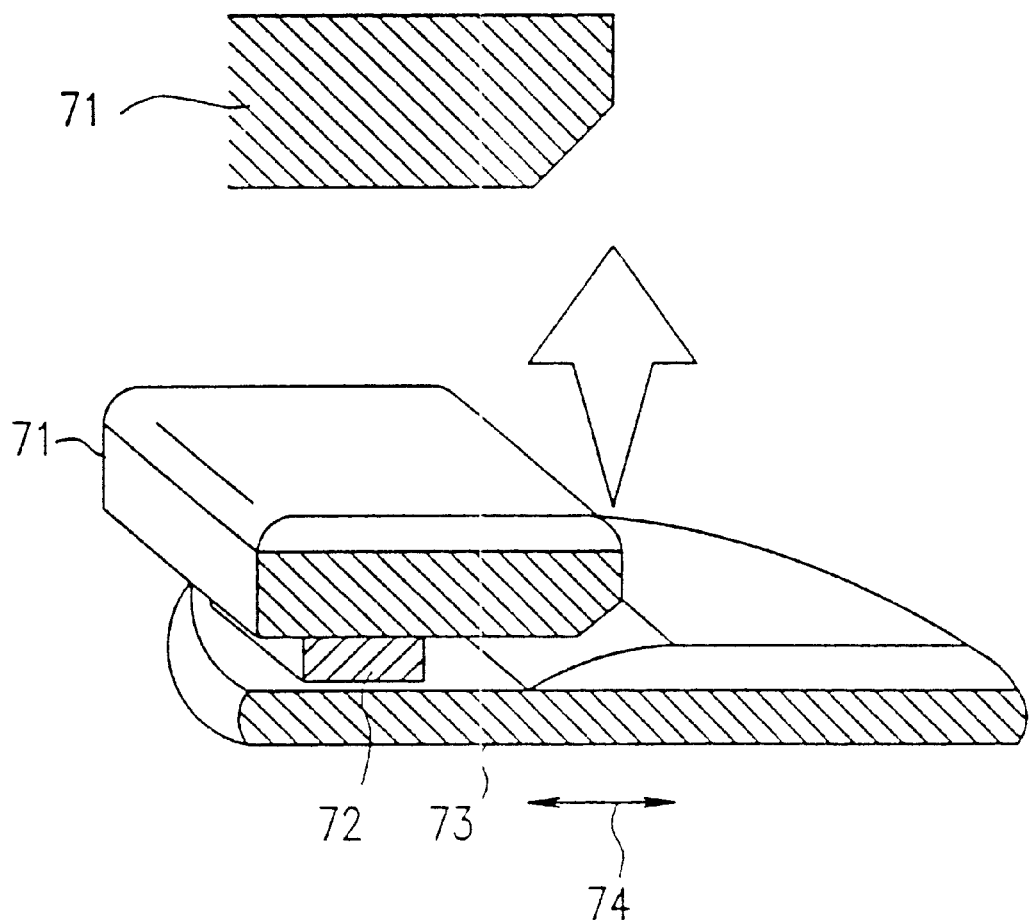
FIG. 16 is an isometric view illustrating a method for forming a tapering portion having a tip which is omni-directed in a polarization detection device according to the present invention.
Figure 17:
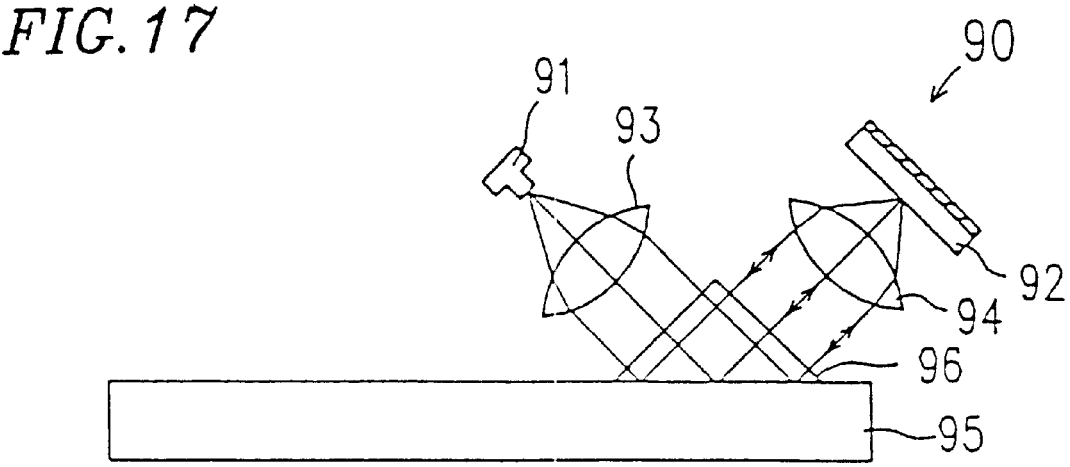
FIG. 17 is a side view of a conventional waveguide-type magneto-optic information recording and reproduction device.
Figure 18:
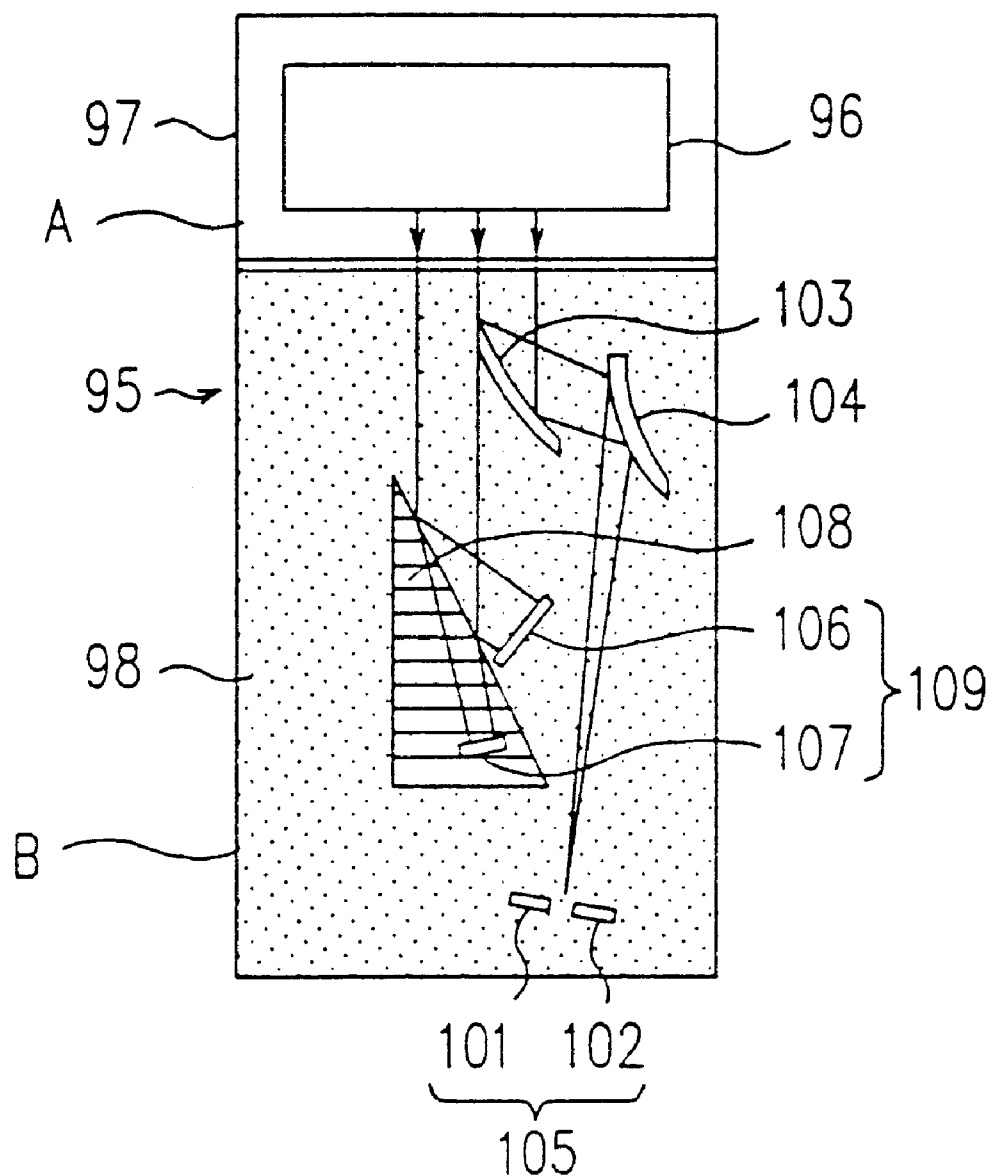
FIG. 18 is a plan view of a splitter to be mounted in the conventional waveguide-type magneto-optic information recording and reproduction device shown in FIG. 17.
Figure 19:
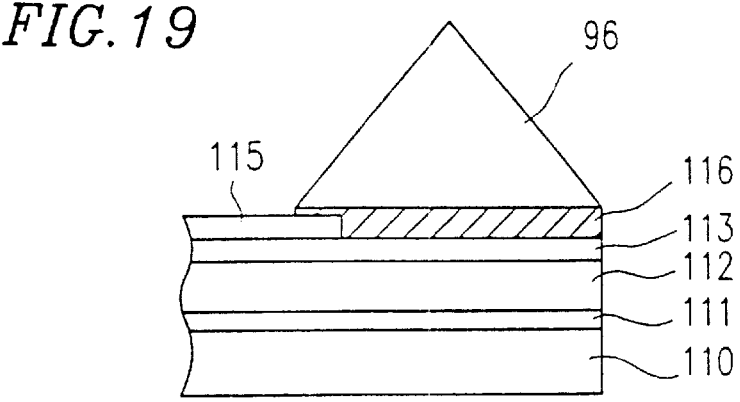
FIG. 19 is a side view of a conventional photocoupler.
Figure 20:
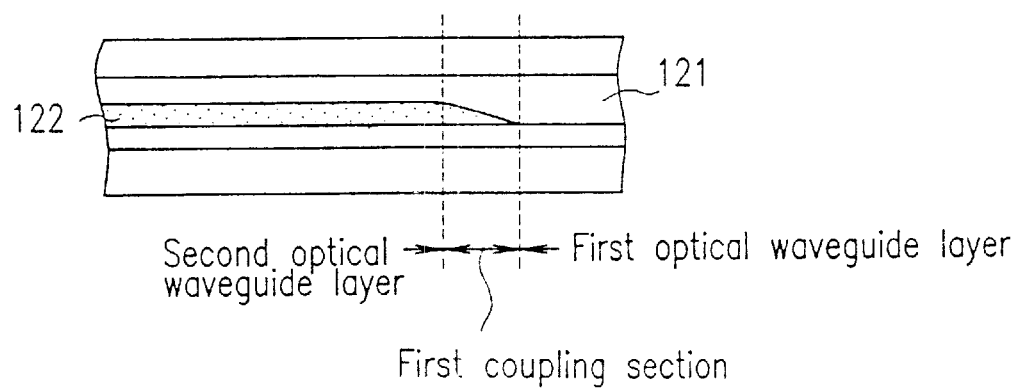
FIG. 20 is a cross-sectional view of a conventional mode splitter.
Figure 22A:
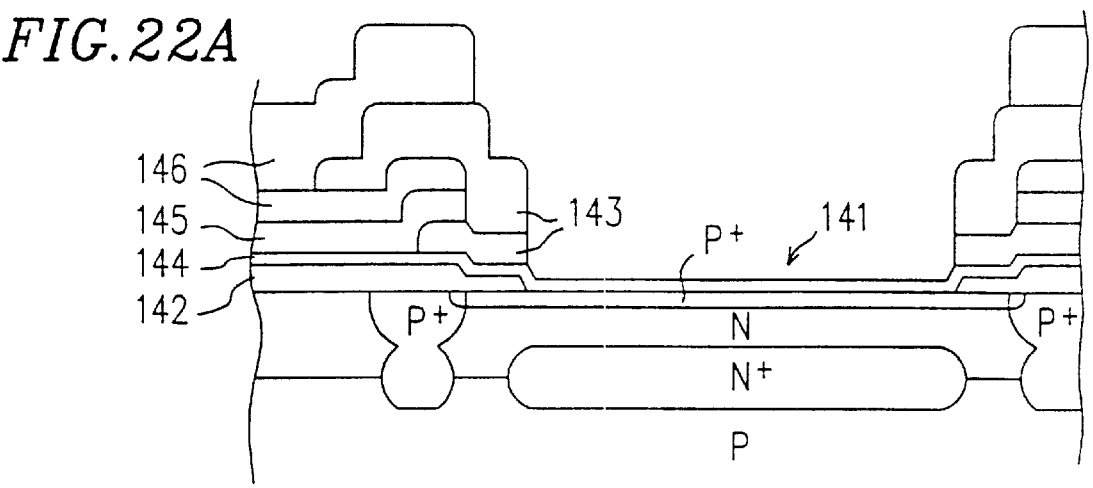
FIG. 22A is a cross-sectional view of a conventional photodetector produced in parallel with an integrated circuit.
Figure 22B:
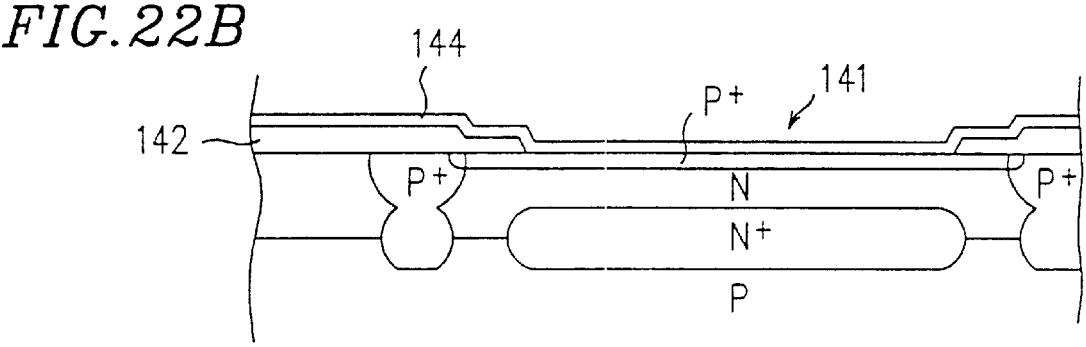
FIG. 22B is a cross-sectional view of another conventional photodetector produced in parallel with an integrated circuit.
Figure 24:
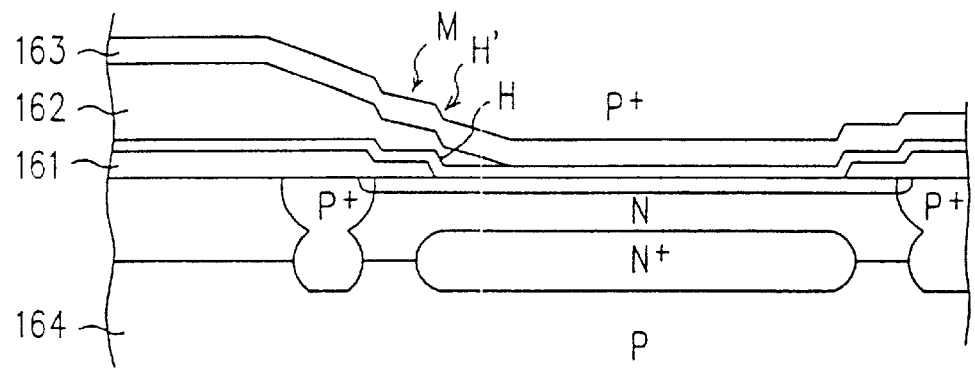
FIG. 24 is a cross-sectional view of a conventional waveguide-type photodetector having a tapering portion.
Figure 25:
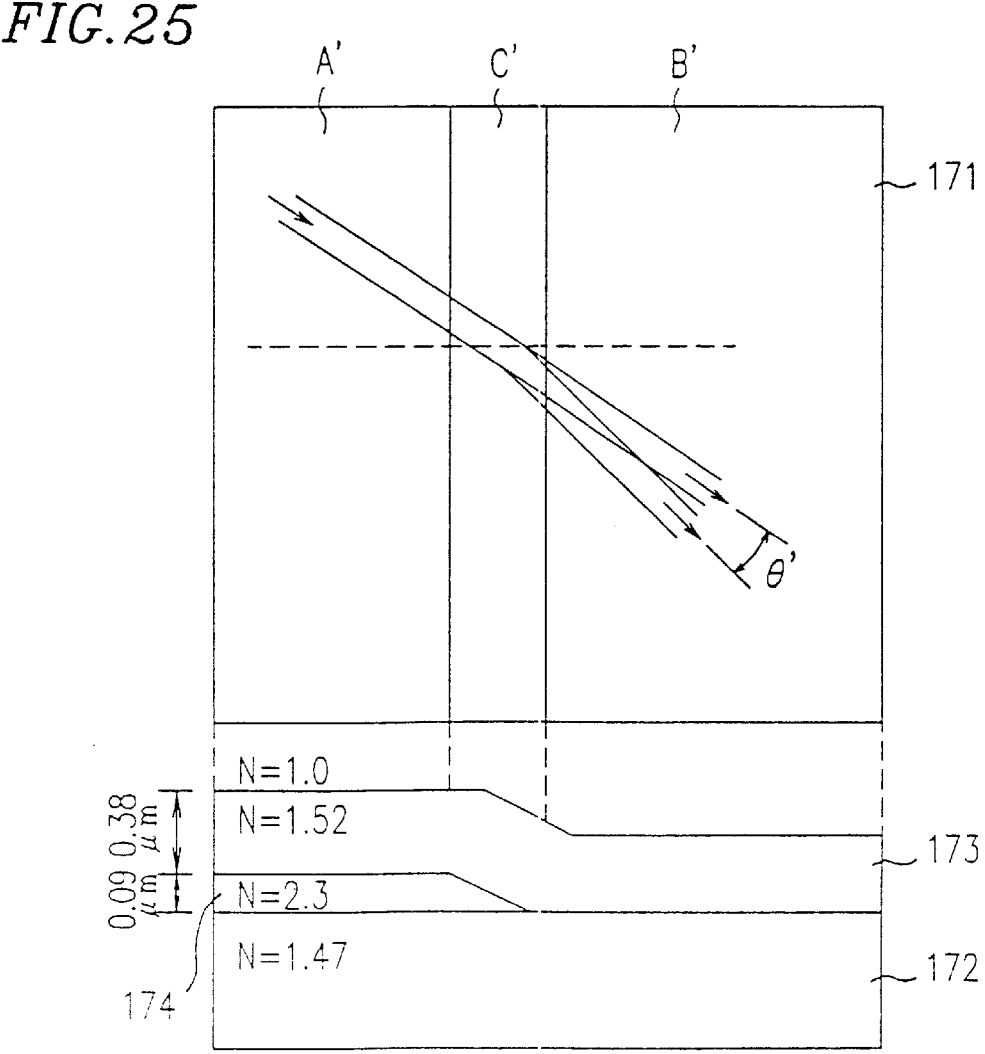
FIG. 25 is a view of a conventional mode splitter in the conventional waveguide-type photodetector.

In FIG. 16, a metal mask 71 is provided a certain distance away from the semiconductor substrate 73 by a spacer 72. When the film formation is performed from above in this state, film forming particles come into an area covered by the mask 71. As a result, the film has a thickness which gradually changes. Thus, a tapered portion 74 shown in FIG. 16 is obtained.

As described above, according to the polarization detection device of the present invention, the prism or the beam splitter acting as a photocoupler is supported on the optical waveguide layer only by the adhesive layer having a straight edge surface. Therefore, a low-priced photocoupler which is produced without high processing precision can be used. Furthermore, the structure between the prism or beam splitter and the optical waveguide layer is simplified, and the influence of a stress is alleviated by contraction of the adhesive. In consequence, unexpected delamination of the photocoupler does not occur, thus improving the reliability.

Where the longer diameter of a beam spot (of the light incident on the photocoupler) on an interface between the adhesive layer and the optical waveguide layer is L, and the angle of incidence of the light with respect to the optical waveguide layer is θ, the thickness of the adhesive layer d is at least L/tan θ. Accordingly, the adhesive layer does not act as a thin film, and thus multiple reflections do not occur. Since optical loss caused by the multiple reflections is suppressed, the coupling efficiency is improved.

The adhesive layer can have a substantially T-shaped pattern including a longitudinal portion extending in a first direction and a transverse portion extending in a second direction perpendicular to the first direction. The substantially T-shaped pattern can have a structure, in which a length of the substantially T-shaped pattern in the first direction is sufficiently longer than a length in the first direction of an adhesion plane of the prism or the beam splitter acting as the photocoupler and the adhesive layer. A length of the transverse portion in the first direction is shorter than a length of the photocoupler in the first direction, and a length of the longitudinal direction in the second direction is shorter than a length of the one-chip photocoupler in the second direction. In such a case, the prism or the beam splitter is efficiently supported by an appropriate amount of adhesive. Thus, an adverse influence by extra adhesive is avoided.

The substantially T-shaped pattern can have an outside portion outside the prism or the beam splitter and a covered portion covered by the prism or the beam splitter. In the case where a length of the outside portion in the second direction is shorter than a length of the covered portion in the second direction, the substantially T-shaped pattern is filled with the adhesive efficiently.

In the case where a top surface of the prism or the beam splitter is optically polished, the filling process of the substantially T-shaped pattern with the adhesive can be observed. Accordingly, the filling process is performed efficiently and accurately.

In the case where an area of the surface of the optical waveguide layer which adheres to the prism or the beam splitter and a bottom surface of the prism or the beam splitter are plasma-processed before adhesion, the adhesiveness therebetween is increased. Accordingly, the reliability of the photocoupler is raised.

According to the present invention, a moisture-resistant protection layer is formed on at least one of a light incident plane and a light reflecting plane of the dielectric blocks before dicing and the moisture-resistant protection layer is removed after dicing. By such a method, dust is prevented from adhering to the light incident plane of the dielectric blocks, thus suppressing the decline in the photocoupling efficiency and stabilizing the characteristics of the polarization detection device.

In the case where the protection layer is formed of a liquid material which contains an organic solvent and forms a polymer coat when dried, the formation and removal of the protection layer is facilitated, thus improving the workability.

In the case where the protection layer is formed of a photoresist material, the protection layer is removed by a resist remover which is compatible with a photographic process. Thus, the workability is improved.

In the case where the protection layer is formed after the dielectric blocks are secured to the substrate, the dielectric blocks are easily held, and moreover, the protection layer material is prevented from coming into the adhesion plane of the dielectric blocks. Thus, the workability is improved.

According to the present invention, the semiconductor substrate and the optical waveguide layer are separated from each other by a dielectric layer having a thickness greater than a thickness of a highest portion of a combination of the photodetector and an integrated circuit, and the dielectric layer is set to have such a thickness so as to allow the dielectric layer to act as a buffer layer. Therefore, the lower layers are prevented from being exposed during the processing. Thus, the propagation loss in the optical waveguide layer is not adversely influenced, and the coupling efficiency is improved.

In the case where the dielectric layer is formed of one of a single NSG layer and a laminate including the single NSG layer, the dopant contained in the dielectric layer does not absorb the propagation light. For this reason also, the coupling efficiency is improved.

In the case where the dielectric layer is formed of one of a single PSG layer, a single BPSG layer, and a laminate including one of the single PSG layer and the single BPSG layer, the film stress of the dielectric layer is alleviated. Thus, changes in the characteristics of the polarization detection device and the generation of cracks are suppressed.

According to the present invention, a photoelectric converter having an impurity diffusion region is formed in the semiconductor substrate, an optical waveguide element including the optical waveguide layer is provided above the photoelectric converter with the dielectric layer interposed therebetween, and a part of the optical waveguide layer and the impurity diffusion region are included in a light receiving region where photocoupling is allowed to occur, and the light receiving region includes a tapered portion including a part of the dielectric layer having a gradually decreasing thickness and the optical waveguide layer provided on the part of the dielectric layer. Therefore, the propagation loss is reduced, and so the photocoupling efficiency is improved.

In the case where the tapered portion has a smooth top surface without any bending edge and a maximum sloping angle of about 10 degrees, the photocoupling efficiency is further improved.

The dielectric layer can be set to have such a thickness so as to allow the dielectric layer to act as a buffer layer in the light receiving region (where photocoupling can occur) in the vicinity of an end of the impurity diffusion region, and the dielectric layer can be a tapering end having a thickness of zero in the impurity diffusion region. In such a case, the propagation light is efficiently guided to the photodetecting section.

In the case where the light receiving region has an area over a distance of at least 20$\mu$m, adjacent to the tapering end of the dielectric layer, where the thickness of the dielectric layer is zero, the coupling of the propagation light to the photodetecting section is facilitated.

In the case where a protection layer is provided at least one of between the photoelectric converter having the impurity diffusion region and the dielectric layer and between the photoelectric converter in the light receiving region and the optical waveguide layer in the light receiving region, invasion of contaminants is prevented, and thus adverse influences of the external contaminants on the photoelectric converter and the integrated circuit and damages caused thereto during the processing are suppressed.

In the case where the protection layer is formed of silicon nitride obtained as a result of low-pressure CVD, the polarization detection devices obtain satisfactory characteristics and are produced at a high productivity.

In the case an anti-reflection layer is provided between the photoelectric converter and the dielectric layer in the light receiving region, and the optical waveguide layer in the light receiving region, the coupling efficiency of the propagation light to the photoelectric converter is improved while restricting damage to the device during the processing.

The device may include an anti-reflection layer which acts on incident light having an angle of incidence $\theta i$, which is defined by $\theta i = \sin^{-1}(n_b/ngl)$, with respect to the line vertical to the dielectric layer on or the optical waveguide layer, where ngl is the refractive index of a lowermost layer of the optical waveguide layer and $n_b$ is the refractive index of the dielectric layer. In this case, the coupling efficiency of the propagation light to the photoelectric converter is improved while restricting damage to the device during the processing further efficiently.

In the case where the anti-reflection layer is formed of silicon nitride obtained as a result of plasma CVD, the polarization detection devices obtain satisfactory characteristics and are produced at a high productivity, the coupling efficiency of the propagation light to the photoelectric converter is improved while restricting damages during the processing still further efficiently.

An area surrounded by a portion formed when the impurity diffusion layer can be larger than the light receiving region; and a photocoupling section, the optical waveguide layer and the polarization splitter of the photocoupler and the entirety of the photodetector can be provided in an area corresponding to the area surrounded by the step portion. In such a case, the waveguide light does not pass above the step portion, and so the problems caused by the step portion to designing and processing of the photodetecting section are eliminated. Therefore, the conventionally-structured waveguide-type photodetector having a tapering waveguide layer can be applied to the photodetector conformed to the demands of high-speed response and high integration.

According to the present invention, the interconnection and a metal layer of the integrated circuit adjacent to the photodetecting section are not exposed at a higher level than the level of a top surface of the dielectric layer. Therefore, even when another dielectric layer is added during the processing, the lower layer is not exposed. Thus, the propagation loss in the optical waveguide layer is not adversely influenced.

According to the present invention, the polarization splitter includes a high refractive index region formed by patterning, and is provided between the photocoupler and the optical waveguide layer so that the tapered portion is positioned around the polarization splitter. Therefore, the propagation loss caused at the border between the photocoupler and the optical waveguide layer is suppressed, thus improving the coupling efficiency. Propagation light can be split so as to provide both satisfactory convergency and a large diverging angle.

In the case where the high refractive index region is formed of a high refractive index material provided between the optical waveguide layer and the dielectric layer, the refractive index region is protected against adverse influences of, for example, contamination.

The polarization splitter can have such a shape so as to split the propagating light into two components substantially parallel to a direction of the light propagation and propagate the two components in different directions, and to allow the two components to be refracted a plurality of times by the high refractive index region. In such a case, even when the propagation light is diverging light having a large diverging angle, the diverging angle is reduced after refraction. Thus, the substantial mode splitting angle is increased.

The polarization splitter can have such a shape as to split the propagating light into four components substantially parallel to a direction of the light propagation and propagate the four components in different directions, and to allow the four components to be refracted a plurality of times by the high refractive index region. In such a case, even when the propagation light is diverging light having a large diverging angle, the diverging angle is further reduced after refraction. Thus, the substantial mode splitting angle is increased. The propagation distance of the mode light is shortened.

The polarization splitter can have such a shape as to refract the propagating light split into two or four components in a direction distanced from the center of the propagating light before split. In such case, spatial crossing of polarization of different modes does not occur. Therefore, splitting and detection of the polarization are performed accurately.

The polarization splitter can have such a shape that, among four components obtained by splitting the propagating light, inner two components are refracted at a larger angle than outer two components. In such a case, the number of photodetecting sections to which the propagation light is guided is reduced. Therefore, the characteristic deviation is restricted.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A polarization detection device, comprising:
    a photocoupler;
    an optical waveguide layer for propagating light from the photocoupler therethrough;
    a polarization splitter for splitting the propagation light into two components having different refractive angles; and
    a photodetector formed of a semiconductor material for performing photoelectric conversion on the propagation light split into the two components, wherein:
        the photocoupler, the optical waveguide layer, the polarization splitter, and the photodetector are provided on a single semiconductor substrate,
        the photocoupler is one of a prism and a beam splitter formed of a dielectric material and supported by the optical waveguide layer only by an adhesive layer, the adhesive layer having a straight edge in the vicinity of the photocoupler, and
        the adhesive layer has a thickness d fulfilling expression (1) where a longer diameter of a beam spot of the light incident on the photocoupler on an interface between the adhesive layer and the optical waveguide layer is L, and the angle of incidence of the light with respect to the optical waveguide layer is $\theta$:

$$d \geq L/\tan\theta \qquad (1).$$

2. A polarization detection device according to claim 1, wherein:
    the adhesive layer has a substantially T-shaped pattern including a longitudinal portion extending in a first direction and a transverse portion extending in a second direction perpendicular to the first direction,
    a length of the longitudinal portion in the first direction is sufficiently longer than a length in the first direction of a contact plane of the photocoupler and the adhesive layer,
    a length of the transverse portion in the first direction is shorter than a length of the photocoupler in the first direction, and
    a length of the longitudinal direction in the second direction is shorter than a length of the photocoupler in the second direction.

3. A polarization detection device according to claim 2, wherein the substantially T-shaped pattern has an outside portion outside the photocoupler and a covered portion covered by the photocoupler, and a length of the outside portion in the second direction is shorter than a length of the covered portion in the second direction.

4. A polarization detection device according to claim 1, wherein a top surface of the photocoupler is optically polished.

5. A polarization detection device according to claim 1, wherein the photocoupler is adhered on a surface of the optical waveguide layer by the adhesive layer, and an area of the surface of the optical waveguide layer which is adhered to the photocoupler and a bottom surface of the photocoupler are plasma-processed before adhesion.

6. A polarization detection device, comprising:
    a photocoupler;
    an optical waveguide layer for propagating light from the photocoupler therethrough;
    a polarization splitter for splitting the propagation light into two components having different refractive angles; and
    a photodetector formed of a semiconductor material for performing photoelectric conversion on the propagation light split into the two components, wherein:
        the photocoupler, the optical waveguide layer, the polarization splitter, and the photodetector are provided on a single semiconductor substrate, and
        the semiconductor substrate and the optical waveguide layer are separated from each other by a dielectric layer having a thickness sufficient to prevent light absorption into the semiconductor substrate, and to allow the dielectric layer to act as a buffer layer.

7. A polarization detection device according to claim 6, wherein the dielectric layer is formed of one of a single NSG layer and a laminate including the single NSG layer.

8. A polarization detection device according to claim 6, wherein the dielectric layer is formed of one of a single PSG layer, a single BPSG layer, and a laminate including one of the single PSG layer and the single BPSG layer.

9. A polarization detection device, comprising:
    a photocoupler;
    an optical waveguide layer for propagating light from the photocoupler therethrough;
    a polarization splitter for splitting the propagation light into two components having different refractive angles; and
    a photodetector formed of a semiconductor material for performing photoelectric conversion on the propagation light split into the two components, wherein:
        the photocoupler, the optical waveguide layer, the polarization splitter, and the photodetector are provided on a single semiconductor substrate, and
        the photodetector is a photoelectric converter having an impurity diffusion region formed in the semiconductor substrate, an optical waveguide element including the optical waveguide layer is provided above the photoelectric converter with a dielectric layer interposed therebetween, and a part of the optical waveguide layer and the impurity diffusion region are included in a light receiving region where photocoupling is allowed to occur, and
        the light receiving region includes a tapered portion including a part of the dielectric layer having a gradually decreasing thickness and the optical waveguide layer provided on the part of the dielectric layer.

10. A polarization detection device according to claim 9, wherein the tapered portion has a smooth top surface without any bending edge and a maximum sloping angle of about 10 degrees.

11. A polarization detection device according to claim 9, wherein the dielectric layer is set to have such a thickness as to allow the dielectric layer to act as a buffer layer in the light receiving region in the vicinity of an end of the impurity diffusion region, and the dielectric layer has a tapering end having a thickness of about zero in the impurity diffusion region.

12. A polarization detection device according to claim 9, wherein the light receiving region has an area over a distance of at least 20 µm, and is adjacent to the tapering end of the dielectric layer, where the thickness of the dielectric layer is about zero.

13. A polarization detection device according to claim 9, wherein a protection layer is provided at least one of between the photoelectric converter having the impurity diffusion region and the dielectric layer and between the photoelectric converter in the light receiving region and the optical waveguide layer in the light receiving region.

14. A polarization detection device according to claim 13, wherein the protection layer is formed of silicon nitride obtained as a result of low-pressure CVD.

15. A polarization detection device according to claim 9, further comprising an anti-reflection layer located between the photoelectric converter and the dielectric layer in the light receiving region, and the optical waveguide layer in the light receiving region, the antireflection layer acting on incident light having an angle of incidence θi, which is defined by $\theta i = \sin^{-1}(n_b/ngl)$, with respect to a line vertical to the dielectric layer on or the optical waveguide layer, where the refractive index of a lowermost layer of the optical waveguide layer is ngl and the refractive index of the dielectric layer is $n_b$.

16. A polarization detection device according to claim 15, wherein the anti-reflection layer is formed of silicon nitride obtained as a result of plasma CVD.

17. A polarization detection device according to claim 9, wherein an area surrounded by a step portion formed when the impurity diffusion layer is larger than the light receiving region; and a photocoupling section, the optical waveguide layer and the polarization splitter of the photocoupler and the entirety of the photodetector are provided in an area corresponding to the area surrounded by the step portion.

18. A polarization detection device, comprising:

a photocoupler;

an optical waveguide layer for propagating light from the photocoupler therethrough;

a polarization splitter for splitting the propagation light into two components having different refractive angles; and a photodetector formed of a semiconductor material for performing photoelectric conversion on the propagation light split into the two components, wherein:

the photocoupler, the optical waveguide layer, the polarization splitter, and the photodetector are provided on a single semiconductor substrate, and the optical waveguide layer is provided on dielectric layer, an interconnection and an integrated circuit are adjacent to the photodetector, and the interconnection and a metal layer of the integrated circuit are not exposed at a higher level than the level of a top surface of the dielectric layer.

19. A polarization detection device, comprising:

a photocoupler;

an optical waveguide layer for propagating light from the photocoupler therethrough;

a polarization splitter for splitting the propagation light into two or four components having different refractive angles; and a photodetector formed of a semiconductor material for performing photoelectric conversion on the propagation light split into the two or four components, wherein:

the photocoupler, the optical waveguide layer, the polarization splitter, and the photodetector are provided on a single semiconductor substrate, the optical waveguide layer includes a tapered portion having a thickness gradually changing in a direction of light propagation, and the polarization splitter includes a high refractive index region formed by patterning, and is provided between the photocoupler and the optical waveguide layer so that the tapered portion is positioned around the polarization splitter.

20. A polarization detection device, according to claim 19, wherein the optical waveguide layer is provided on a dielectric layer, and the high refractive index region is formed of a high refractive index material provided between the optical waveguide layer and the dielectric layer.

21. A polarization detection device, according to claim 19, wherein the polarization splitter has such a shape as to split the propagation light into two components substantially parallel to a direction of the light propagation and propagate the two components in different directions, and allows the two components to be refracted a plurality of times by the high refractive index region.

22. A polarization detection device, according to claim 19, wherein the polarization splitter has such a shape as to split the propagation light into four components substantially parallel to a direction of the light propagation and propagate the four components in different directions, and allows the four components to be refracted a plurality of times by the high refractive index region.

23. A polarization detection device, according to claim 19, wherein the polarization splitter has such a shape as to refract the propagation light split into two or four components in a direction distanced from the center of the propagation light before split.

24. A polarization detection device, according to claim 19, wherein the polarization splitter has such a shape that four components obtained by splitting the propagation light include two inner components and two outer components, and wherein the two inner components are refracted at a larger angle than the two outer components.

* * * * *